United States Patent
McCullough et al.

(10) Patent No.: US 10,823,251 B2
(45) Date of Patent: Nov. 3, 2020

(54) SEAT-DAMPING DEVICES, SYSTEMS, AND METHODS

(71) Applicant: LORD Corporation, Cary, NC (US)

(72) Inventors: Aaron McCullough, Raleigh, NC (US); Michael Jarzomski, Apex, NC (US); Richard Wilder, Moncure, NC (US)

(73) Assignee: LORD Corporation, Cary, NC (US)

( * ) Notice: Subject to any disclaimer, the term of this patent is extended or adjusted under 35 U.S.C. 154(b) by 100 days.

(21) Appl. No.: 16/060,099

(22) PCT Filed: Dec. 21, 2016

(86) PCT No.: PCT/US2016/067924
§ 371 (c)(1),
(2) Date: Jun. 7, 2018

(87) PCT Pub. No.: WO2017/112729
PCT Pub. Date: Jun. 29, 2017

(65) Prior Publication Data
US 2018/0363724 A1    Dec. 20, 2018

Related U.S. Application Data

(60) Provisional application No. 62/270,121, filed on Dec. 21, 2015.

(51) Int. Cl.
*F16F 9/53*    (2006.01)
*B60N 2/50*    (2006.01)
(Continued)

(52) U.S. Cl.
CPC .............. *F16F 9/535* (2013.01); *B60N 2/501* (2013.01); *B60N 2/508* (2013.01); *B60N 2/527* (2013.01);
(Continued)

(58) Field of Classification Search
CPC .. F16F 9/535; F16F 9/19; F16F 9/3292; F16F 2222/06; F16F 2224/045; F16F 2228/066;
(Continued)

(56) References Cited

U.S. PATENT DOCUMENTS 5,277,281 A    1/1994  Carlson et al.
5,284,330 A    2/1994  Carlson et al.
(Continued)

FOREIGN PATENT DOCUMENTS

GB    2372793    9/2002
WO    03/019037    3/2003

OTHER PUBLICATIONS

Poynor, James C., Innovative Designs for Magneto-Rheological Dampers, Aug. 7, 2001, 96 pgs.
(Continued)

*Primary Examiner* — Thomas W Irvin
(74) *Attorney, Agent, or Firm* — Jenkins, Wilson, Taylor & Hunt, P.A.

(57) ABSTRACT

Seat-damping devices, systems, and methods for damping vibrations are disclosed. A fail-safe permanent magnet is used with an electromagnet to create damping of induced vibrations in a seat-damping device using magnetorheological, electrorheological, magnetically responsive powders and other magnetically responsive materials.

28 Claims, 16 Drawing Sheets

(51) Int. Cl.
  *B60N 2/52* (2006.01)
  *F16F 9/19* (2006.01)
  *F16F 9/32* (2006.01)
(52) U.S. Cl.
  CPC ............. *F16F 9/19* (2013.01); *F16F 9/3292* (2013.01); *B60N 2/502* (2013.01); *F16F 2222/06* (2013.01); *F16F 2224/045* (2013.01); *F16F 2228/066* (2013.01); *F16F 2230/18* (2013.01)
(58) Field of Classification Search
  CPC ..... F16F 2230/18; B60N 2/501; B60N 2/527; B60N 2/508; B60N 2/502
  See application file for complete search history.

(56) References Cited

U.S. PATENT DOCUMENTS

| | | | |
|---|---|---|---|
| 5,551,541 A | 9/1996 | Foster | |
| 5,582,385 A * | 12/1996 | Boyle | B60G 17/018 188/266.1 |
| 5,586,627 A | 12/1996 | Nezu et al. | |
| 5,652,704 A | 7/1997 | Catanzarite | |
| 5,878,851 A | 3/1999 | Carlson et al. | |
| 6,095,486 A * | 8/2000 | Ivers | F16F 9/46 137/909 |
| 6,131,709 A | 10/2000 | Jolly et al. | |
| 6,390,252 B1 * | 5/2002 | Namuduri | F16F 9/535 188/267 |
| 6,390,253 B1 | 5/2002 | Oliver | |
| 6,427,813 B1 * | 8/2002 | Carlson | F16F 9/535 188/267.2 |
| 6,612,409 B2 | 9/2003 | Lun et al. | |
| 6,637,560 B2 | 10/2003 | Oliver et al. | |
| 6,874,603 B2 | 4/2005 | Lisenker et al. | |
| 7,243,763 B2 | 7/2007 | Carlson | |
| 7,822,519 B2 | 10/2010 | Masamura | |
| 7,849,983 B2 | 12/2010 | St. Clair et al. | |
| 7,942,248 B2 | 5/2011 | St. Clair et al. | |
| 7,958,979 B2 | 6/2011 | Sekiya et al. | |
| 8,109,371 B2 | 2/2012 | Kondo et al. | |
| 8,240,439 B2 | 8/2012 | Nakajima et al. | |
| 8,393,447 B2 | 3/2013 | Breun et al. | |
| 8,418,819 B2 | 4/2013 | Battlogg et al. | |
| 8,651,250 B2 * | 2/2014 | Nehl | F16F 9/535 188/267 |
| 8,800,730 B2 | 8/2014 | Battlogg et al. | |
| 9,004,243 B2 | 4/2015 | Nehl et al. | |
| 9,051,988 B2 | 6/2015 | Battlogg et al. | |
| 9,103,398 B2 | 8/2015 | Nakajima | |
| 2002/0130003 A1 * | 9/2002 | Lisenker | F16F 9/535 188/267.2 |
| 2004/0118646 A1 | 6/2004 | Lun | |
| 2007/0023244 A1 | 2/2007 | Carlson et al. | |
| 2007/0257408 A1 | 11/2007 | St Clair | |
| 2008/0053763 A1 | 3/2008 | Wereley et al. | |
| 2008/0142320 A1 | 6/2008 | Moradian | |
| 2009/0294231 A1 | 12/2009 | Carlson et al. | |
| 2010/0089711 A1 * | 4/2010 | Nehl | F16F 9/535 188/267.2 |
| 2010/0161182 A1 | 6/2010 | Contratto et al. | |
| 2011/0121223 A1 * | 5/2011 | Ulicny | H01F 1/447 252/62.52 |
| 2012/0031719 A1 | 2/2012 | Liao et al. | |
| 2014/0152066 A1 | 6/2014 | Hiemenz et al. | |
| 2014/0360353 A1 | 12/2014 | Baalmann et al. | |
| 2015/0159728 A1 | 6/2015 | Elliott | |
| 2018/0209195 A1 * | 7/2018 | Battlogg | F16D 71/00 |

OTHER PUBLICATIONS

Hadadian, Armin, Optimal Design of Magnetorheological Dampers Constrained in a Specific Volume Using Response Surface Method, 2011, 139 pgs.

Imaduddin, Fitrian, et al., A design and modelling review of rotary magnetorheological damper, Materials and Design 51 (2013) 575-591.

Khan, Sadak Ali, et al., Principles, Characteristics and Applications of Magneto Rheological Fluid Damper in Flow and Shear Mode, Procedia Materials Science, 6 (2014) 1547-1556.

Written Opinion and International Search Report for Application No. PCT/US2016/067924 dated Apr. 5, 2017.

* cited by examiner

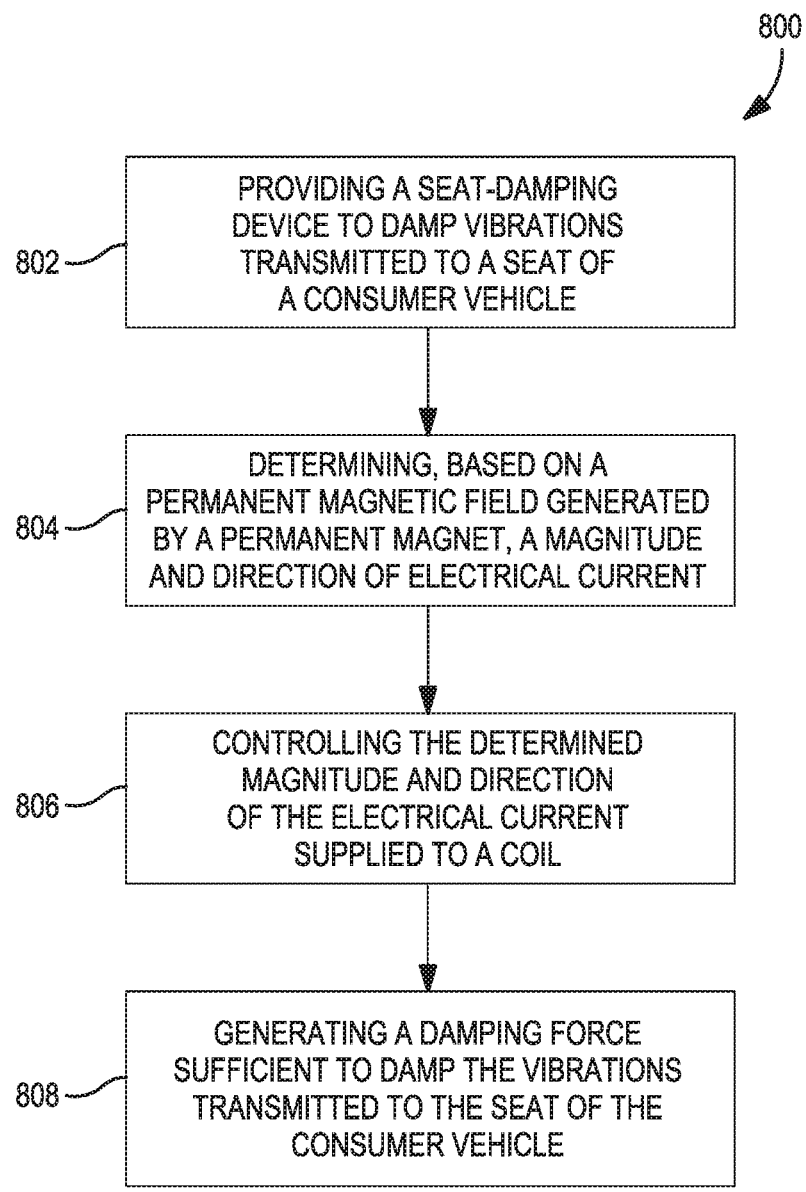

SEAT-DAMPING DEVICES, SYSTEMS, AND METHODS

CROSS REFERENCE TO RELATED APPLICATIONS

The present application claims the benefit of U.S. patent application Ser. No. 62/270,121, filed Dec. 21, 2015, the disclosure of which is incorporated herein by reference in its entirety.

TECHNICAL FIELD

The subject matter disclosed herein relates to improved seat-damping devices, systems, and methods.

BACKGROUND

Manufacturers of commercial vehicles (e.g., Class 8 trucks, off-highway equipment, boat seats, automotive and aerospace applications, etc.) typically incorporate seat-damping systems to absorb impact during operation of the vehicle and achieve a smooth and more comfortable ride for an occupant. Controllable seat-damping systems are becoming increasingly popular, as they can provide a greater degree of damping control during the operation of the vehicle. For example, a controllable seat-damping device configured to provide continuous control of an output force of the damper system over a significant range may provide a greater degree of control of damping, such that vibrations are not transmitted to the seat occupant.

However, currently known solutions for implementing such controllable seat-damping systems are generally unable to control a damping force in a zero-current situation (e.g., during vehicle "creep"). Since damping systems currently employed require a minimum current to energize a magnetic coil in the damping system. That means when no current is applied to energize the magnetic coil, these damping systems will be unable to provide any degree of control in the form of a damping force. Because of this behavior, vibrations are still transmitted to the seat occupant in such instances.

Accordingly, there exists a need for improved seat-damping devices, systems, and methods, which are configured to control a damping force when no current is applied to energize the magnetic coil. There also exists a need for improved seat-damping devices, systems, and methods that are able to achieve a high degree of damping at low current settings in addition to providing a relatively lower degree of damping when no current is applied to the magnetic coil (e.g., when the damping device is in an "off-state"). Improved seat-damping devices, systems, and methods are advantageously safer, easier to manufacture, more efficient, and more comfortable for vehicle occupants in comparison to existing seat-damping systems.

SUMMARY

In one aspect, a seat-damping device for damping vibrations transmitted to a seat of a vehicle is provided. The seat-damping device comprises a housing, a plurality of poles, at least one coil, at least one permanent magnet, and a magnetorheological (MR) fluid. The housing has an interior, an upper interior chamber, and a lower interior chamber. The plurality of poles are disposed within the interior of the housing. The at least one coil is disposed adjacent to the plurality of poles and configured generate a current-induced magnetic field proportional to a magnitude and polarity of an electrical current supplied to the coil, the polarity based upon a direction of the electrical current. The at least one permanent magnet configured to generate a permanent magnetic field. The MR fluid is disposed within and filling substantially all of the upper and lower interior chambers of the housing, the MR fluid being movable between the upper and lower interior chambers, the MR fluid having a predetermined magnetically responsive property, wherein a state of the predetermined magnetically responsive property of the MR fluid is selectively adjustable by subjecting the MR fluid to a net magnetic field including a sum of the current-induced magnetic field and the permanent magnetic field. The seat-damping device is configured to generate a damping force proportional to the net magnetic field.

In another aspect, a seat-damping system for damping vibrations transmitted to a seat of a vehicle. The seat-damping system comprises at least one sensor. a controller, and a seat-damping device. The controller includes at least one hardware processor and at least one memory, the controller in electronic communication with the at least one sensor. The seat-damping device in electronic communication with the controller, the seat-damping device configured to be controlled by the controller to generate a damping force sufficient to damp the vibrations transmitted to the seat of the vehicle, the controller configured to calculate a damping solution and transmit a control signal to a seat-damping device. The seat-damping device further comprises a housing, a plurality of poles, at least one coil, at least one permanent magnet, and a magnetorheological (MR) fluid. The housing has an interior, an upper interior chamber, and a lower interior chamber. The plurality of poles are disposed within the interior of the housing. The at least one coil is disposed adjacent to the plurality of poles and configured generate a current-induced magnetic field proportional to a magnitude and polarity of an electrical current supplied to the coil, the polarity based upon a direction of the electrical current. The at least one permanent magnet configured to generate a permanent magnetic field, the permanent magnetic field providing a fail-safe mode for the seat-damping device. The MR fluid disposed within the housing and movable between the upper interior chamber and the lower interior chamber, the MR fluid having a predetermined magnetically responsive property, wherein a state of the predetermined magnetically responsive property of the MR fluid is selectively adjustable by subjecting the MR fluid to a net magnetic field including a sum of the current-induced magnetic field and the permanent magnetic field. The damping force generated by the seat-damping device is proportional to the net magnetic field.

In yet another aspect a method for damping vibrations transmitted to a seat of a vehicle. The method comprises:
  detecting a vibration of the vehicle using at least one sensor;
  providing a seat-damping device configured to damp the vibrations transmitted to the seat of the commercial vehicle, the seat-damping device further comprising:
    a housing having an interior, an upper interior chamber and a lower interior chamber;
    a plurality of poles disposed within the interior of the housing;
    a coil disposed adjacent to the plurality of poles, the coil configured to generate a current-induced magnetic field proportional to a magnitude and polarity of the current-induced magnetic field, the polarity based upon a direction of an electrical current supplied to the coil;

a permanent magnet for generating a permanent magnetic field; and a magnetorheological (MR) fluid disposed within the housing and movable between the upper interior chamber and the lower interior chamber, the MR fluid having a predetermined magnetically responsive property, wherein a state of the predetermined magnetically responsive property of the MR fluid is selectively adjustable by subjecting the MR fluid to a net magnetic field comprising a sum of the current-induced magnetic field and the permanent magnetic field;

communicating the detected vibrations communicated from the at least one sensor to a controller, controller including at least one hardware processor and memory;

calculating in the controller, based on the permanent magnetic field generated by the permanent magnet, the magnitude and the polarity of the electrical current to be supplied to the coil in order achieve a damping force sufficient to damp the vibrations transmitted to the seat of the vehicle;

communicating from the controller to the seat-damping device the determined magnitude and polarity of the current-induced magnetic field based upon the direction of the electrical current supplied to the coil to generate the coil induced magnetic field; and generating the damping force, which is proportional to the net magnetic field, sufficient to damp the vibrations transmitted to the seat of the commercial vehicle.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

FIG. 9 is a flow diagram of an example embodiment of a method of damping vibrations transmitted to a seat of a commercial vehicle in accordance with the disclosure herein.

DETAILED DESCRIPTION

Figures (also "FIGS.") 2 through 9 illustrate various aspects, views, and/or features associated with improved seat-damping devices, systems, and/or methods. The improved seat-damping devices, systems, and/or methods are suitable for numerous seat suspension applications. For example, the seat suspension applications may include seating in various commercial vehicles (e.g., off-highway equipment, cars, trucks, boats, off-road devices, construction vehicles, etc.). The improved seat-damping devices and systems described herein damp vibrations associated with operation of vehicles so that vehicle occupants experience a safer and gentler ride in the vehicle, regardless of an operating state of the vehicle. While the example embodiments described herein are directed towards a commercial vehicle, any vehicle having an application where a seat damper may be beneficial in reducing vibration or other force transfers to the occupant will benefit from this invention.

Figure 1:
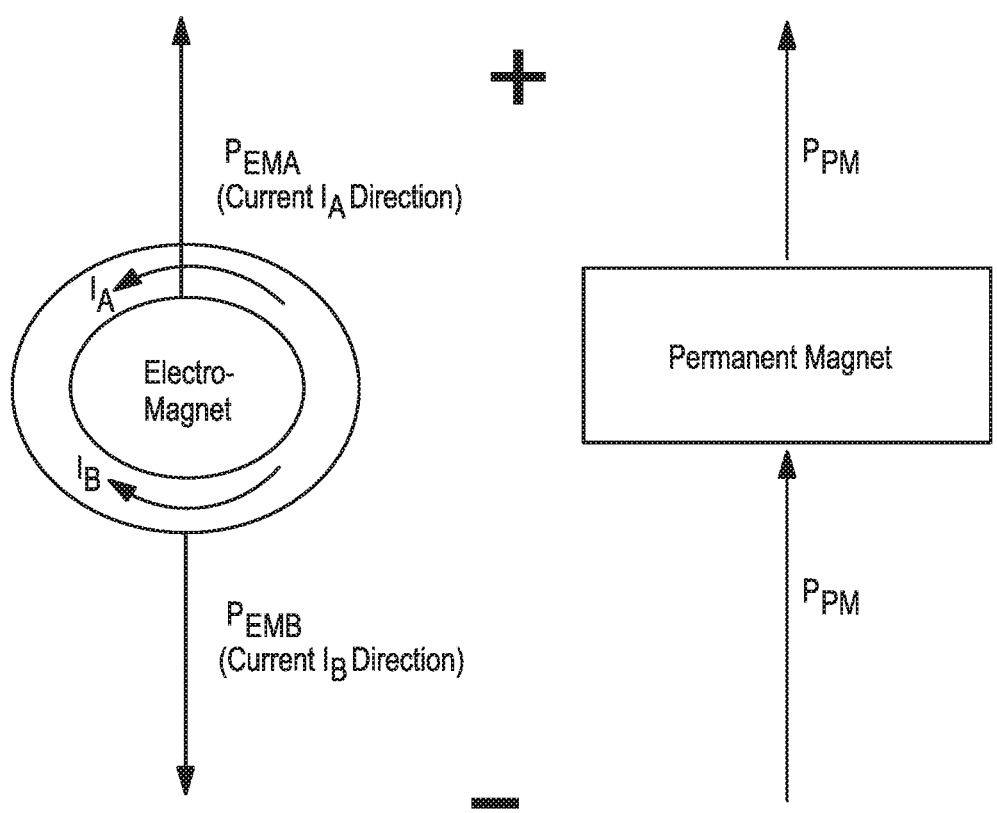
FIG. 1 is a simplified schematic of an electromagnet illustrating current and polarity and of a permanent magnet illustrating polarity, along with the additive and subtractive elements of the polarity.

Prior to describing the invention herein, it will assist the reader to understand the basics of magnetism, permanent magnets and electromagnets. Referring to FIG. 1, a significantly simplified schematic of an electromagnet and a permanent magnet are illustrated. As those having skill in the relevant art know, the polarity of the magnetic field of an electromagnet is determined by the direction the current flows in the electromagnet. As illustrated in FIG. 1, a current I flows in either direction A or direction B. In FIG. 1, when the current I flows in direction A, designated as $I_A$, the polarity, designated as $P_{EMA}$, of the electromagnet is upwards relative to the electromagnet. Oppositely, when the current I flows in direction B, designated as $I_B$, the polarity, designated as $P_{EMB}$, of the electromagnet is downwards relative to the electromagnet. The magnitude of the electromagnetic field related to $P_{EMA}$ or $P_{EMB}$ is determined by the amount of current I flowing through the electromagnet. FIG. 1 does not show the varied magnitude of the electromagnetic field related to $P_{EMA}$ or $P_{EMB}$ as a factor of varied current I.

As those having skill in the relevant art also know, a permanent magnet always has a polarity in one direction, illustrated in FIG. 1 as $P_{PM}$. The magnitude of the magnetic field in the permanent magnet is substantially constant.

Still referring to FIG. 1, when an electromagnet is positioned near a permanent magnet, the polarities are either complementary, as illustrated with the additive nature of $P_{EMA}$ plus $P_{PM}$, or the polarities work against each other, as illustrated with subtractive nature of $P_{EMB}$ minus $P_{PM}$. As those having skill in the art know, the actual additive and subtractive portion of the electromagnet and permanent magnet are the magnetic fields produced by the magnets, and the polarity is the direction of those magnetic fields. This simplified background should provide the reader with the necessary tools to understand the claimed invention.

In some embodiments, the improved seat-damping devices, systems, and methods disclosed herein are configured to generate an initial knee force, which is directly proportional to the strength of a net magnetic field generated in an active region(s) of the device and/or system. In these embodiments, the initial knee force, along with a level of damping at a particular velocity, is capable of yielding a damping force, which counteracts or "absorbs" typical vibrations at the seat that are associated with operation of a vehicle, regardless of the operating state of the vehicle. As used herein, "operating state" refers to an on, off, idle, creep, and/or any other operational mode of such a vehicle. In particular, a permanent magnet incorporated into the seat-damping device may generate a permanent magnetic field to energize a fluid disposed within the seat-damping device and thereby to increase the shear strength thereof, thus increasing resistance of the fluid from flowing through active region(s) of an orifice of the seat-damping device and/or system. In this manner, the seat-damping devices, systems, and methods are configured to damp vibrations generated during any operating state of the vehicle, including scenarios where power may be absent entirely or only minimally available.

In some embodiments, the improved seat-damping devices, systems, and methods disclosed herein are configured to achieve a high damping force at lower current values than is possible according to known seat-damping devices. In addition to the permanent magnetic field generated by the permanent magnet, a current-induced magnetic field may be generated in an additive manner by a coil in a housing of the seat-damping device or system. The additive nature of the current-induced magnetic field enables the current supplied to the coil to be a lower magnitude current to achieve the same damping force of a comparable seat-damping device or system, which lacks a permanent magnet generating a baseline magnetic field.

In some embodiments, the improved seat-damping devices, systems, and methods disclosed herein are configured to achieve a low level or "off-state" damping. Supplying a reverse or negative current to the coil of the device and/or system is advantageous in some such embodiments, as it generates an induced magnetic field having an opposite polarity with a substantially comparable magnitude to that of the permanent magnetic field generated by the permanent magnet. In such a configuration, supplying a higher magnitude (e.g., more negative) current to the coil results in a sum of the permanent magnetic field and the current-induced magnetic field (e.g., a net magnetic field) to provide a value that is low enough that the damping force induced due to magnetic effects is substantially zero when measured at active region(s) of an orifice of the device and/or system. To improve the ability of such systems, devices, and methods to offset the permanent magnetic field with the current-induced field, the magnet and the coil are, in such embodiments, disposed within the seat-damping device and/or system, such that poles of the permanent magnetic field and poles of the current-induced field are aligned. Thus, the improved seat-damping devices, systems, and methods described herein are configured to improve damping control for a seat in any suitable vehicle.

Figure 2:
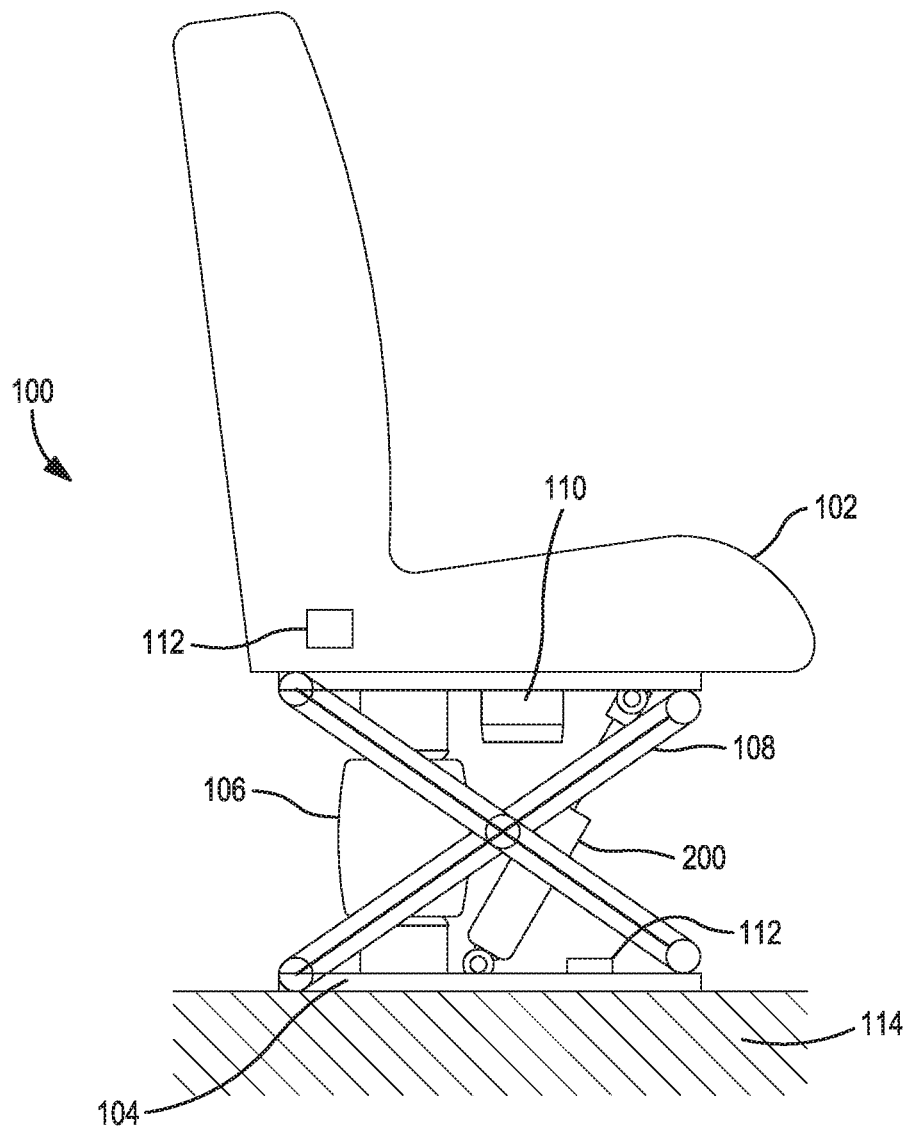
FIG. 2 is a schematic side view of an example embodiment of a seat-damping system in accordance with the disclosure herein.

Referring now to FIG. 2, a schematic side view of an improved seat-damping system is illustrated. The improved seat-damping system is generally designated 100. Seat-damping system 100 is configured to damp and/or absorb vibrations that would otherwise be transmitted to a seat, generally designated 102, from a surface of a vehicle 114. In the configuration illustrated in FIG. 2, seat 102 is mounted on a frame 104 by a suspension system. In some embodiments, the suspension system comprises a spring or other type of passive device (e.g., coil), generally designated 106, and a support device 108. As illustrated in FIG. 2, support device 108 is shown as a scissors mount. Alternatively, the suspension system may comprise other types of devices providing more or less damping support.

A controller 110 is attached or in some way operative connected with seat-damping system 100. In some configurations, a wiring harness (not shown) operatively interconnects controller 110 to other components of seat-damping system 100, as well as to a battery (not shown) or similar source of current. As shown in FIG. 2, controller 110 is mounted to a bottom surface of seat 102. However, controller 110 may be positioned elsewhere relative to seat 102 and/or the commercial vehicle. Preferably, controller 110 is configured to receive input from one or more sensors 112 (e.g., a sensor configured to determine relative displacement between the seat and the vehicle) affixed to and around seat 102 and seat-damping device 200. Upon receiving the input from the one or more sensors 112, controller 110 is configured to calculate a damping solution and transmit a control signal to a seat-damping device 200, which is operatively connected between seat 102 and frame 104 and is configured to generate a current-induced magnetic field. Depending on values received at controller 110 from the one or more sensors 112, controller 110 is configured such that different magnitudes and/or polarities of current are transmitted to seat-damping device 200 for inducing a desired magnetic field at a coil (see, e.g., 218, FIGS. 3C-D) inside seat-damping device 200.

As noted above, seat-damping device 200 is mounted to seat 102. FIG. 2 illustrates a non-limiting example embodiment of seat-damping system 100, where seat-damping device 200 is mounted substantially in parallel with spring 106 and support device 108, being connected at one end to seat 102 and on the other end to frame 104 or a floor of the vehicle. As illustrated, seat-damping system 100 isolates seat 102 and, hence, an occupant, from transmission of vibrational energy from frame 104 or a floor of the vehicle into seat 102. Frame 104 receives vibrational input during normal operation from a number of high and low frequency sources, including, for example, road inputs and engine inputs. Accordingly, seat-damping system 100 is configured to, along with seat-damping device 200, improve control of the damping force generated by seat-damping system 100 by providing a permanent magnetic field and generating and/or controlling a current-induced magnetic field to thereby provide tuned damping for high and low frequency vibrations. The permanent magnetic field provides for a fail-safe mode in the absence of a current-induced magnetic field.

An example embodiment for seat-damping device 200 is illustrated in FIGS. 3A-3D. In some aspects, seat-damping device 200 is an electrorheological (ER) or magnetorheological (MR) controlled fluid damper, referred to herein collectively as "MR" devices using magnetorheological (MR) fluid. Excluding a permanent magnet, in example configurations, seat-damping device 200 is similar to the MR devices described and claimed in U.S. Pat. Nos. 5,277,281 and 5,284,330. In the embodiment illustrated in FIGS. 3A-D, seat-damping device 200 includes a housing 202 having an interior. Seat-damping device 200 has a piston, generally designated 210, with a longitudinally extending shaft 212 (also known as a rod) and a piston head 214 slidable within a cylindrical housing 202, thereby subdividing housing 202 into upper 202A and lower 202B interior chambers. Upper and lower interior chambers 202A and 202B are substantially filled with MR fluid. Piston 210 comprises one or more suitable materials capable of creating a magnetic field using magnetic materials and housed with materials capable of containing the magnetic field, with the housing materials comprising non-magnetic materials. Those having skill in the art know that higher or lower levels of damping force output may be obtained by using various types of materials for piston 210.

Figure 3A:
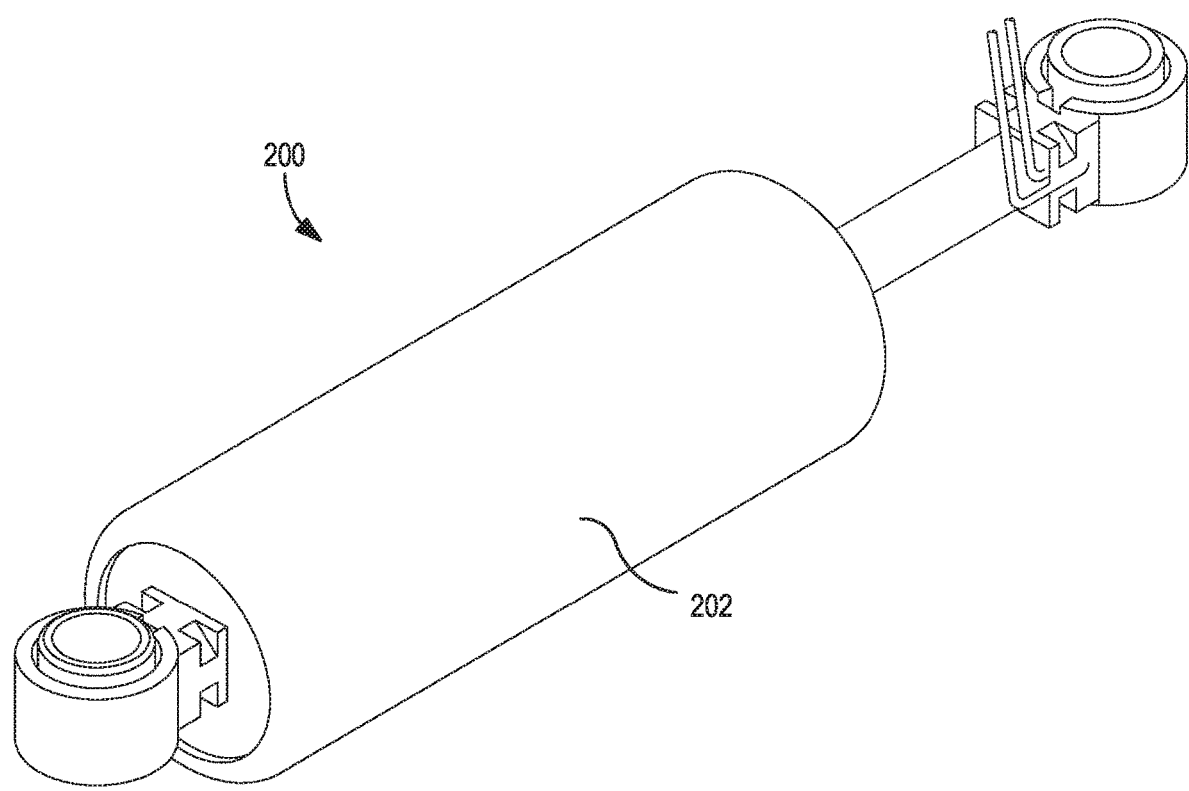
FIG. 3A is a perspective view of an example embodiment of a seat-damping device in accordance with the disclosure herein.
Figure 3B:
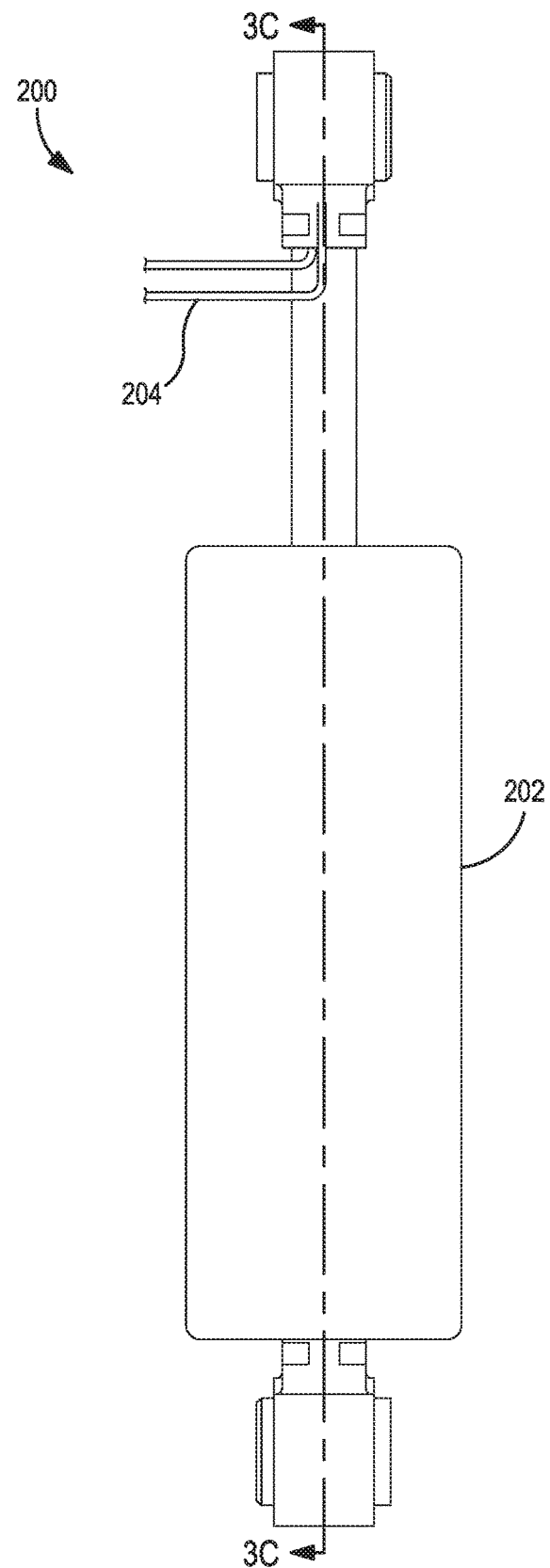
FIG. 3B is a side view of the example embodiment of the seat-damping device of FIG. 3A in accordance with the disclosure herein.
Figure 3C:
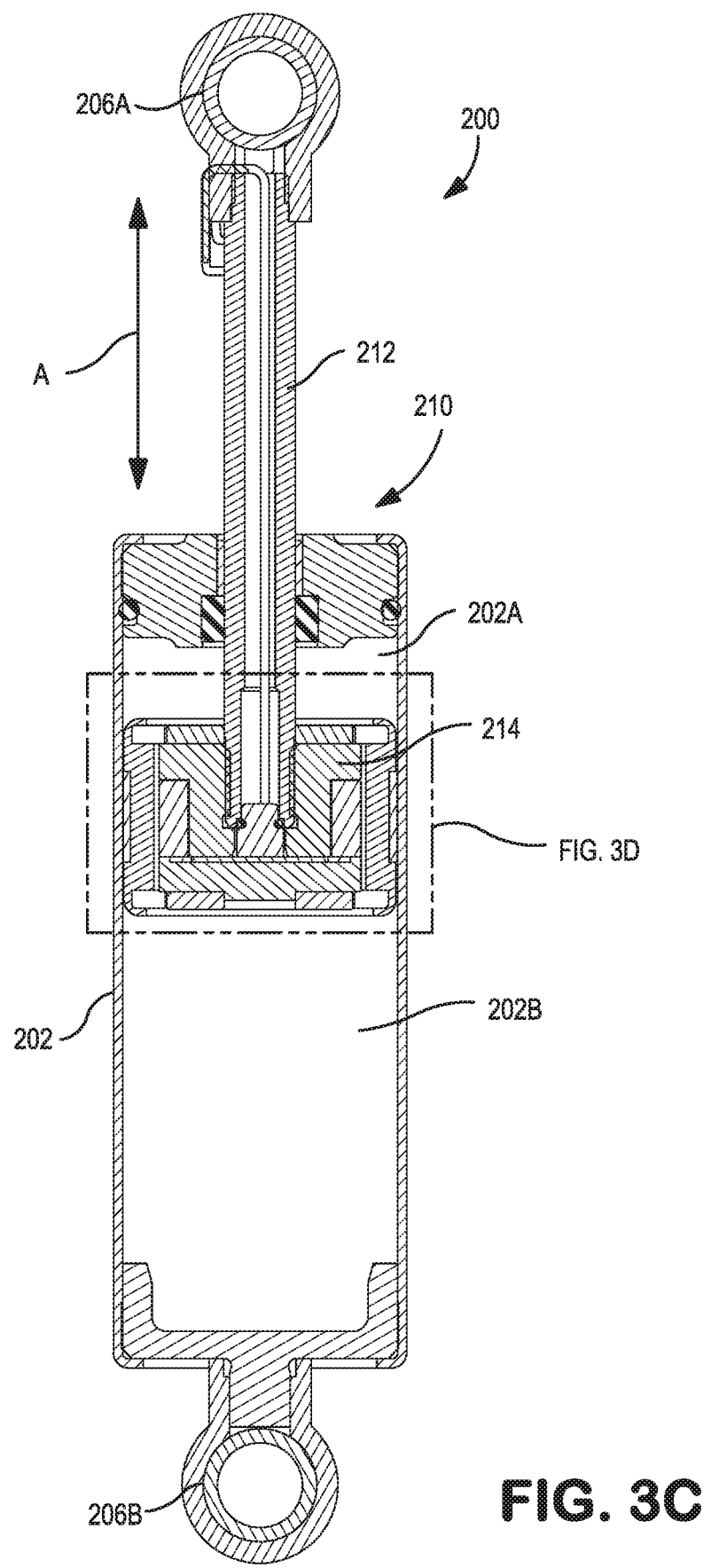
FIG. 3C is a cross-sectional view along section line 3C-3C shown in FIG. 3B of the example embodiment of the seat-damping device of FIG. 3A in accordance with the disclosure herein.

Continuing to refer to the illustrations in FIGS. 3A-3D, longitudinally extending shaft 212 is directionally slidable within an opening in a top surface of cylindrical housing 202. FIG. 3C illustrates that shaft 212 is configured to slide axially within housing 202, substantially in a direction illustrated by arrow A. A first end of shaft 212 includes an upper bearing support 206A for attachment to seat 102, while a second end of shaft 212 terminates in piston head 214. A lower bearing support 206B is proximate a bottom surface of cylindrical housing 202 for attachment of seat-damping device 200 to frame 104 or a floor of the vehicle. Upper and lower bearing supports 206A and 206B may be any suitable coupling mechanism. Piston head 214 is disposed within an interior of housing 202. The movement of piston head 214 is bounded by ends of housing 202.

Figure 3D:
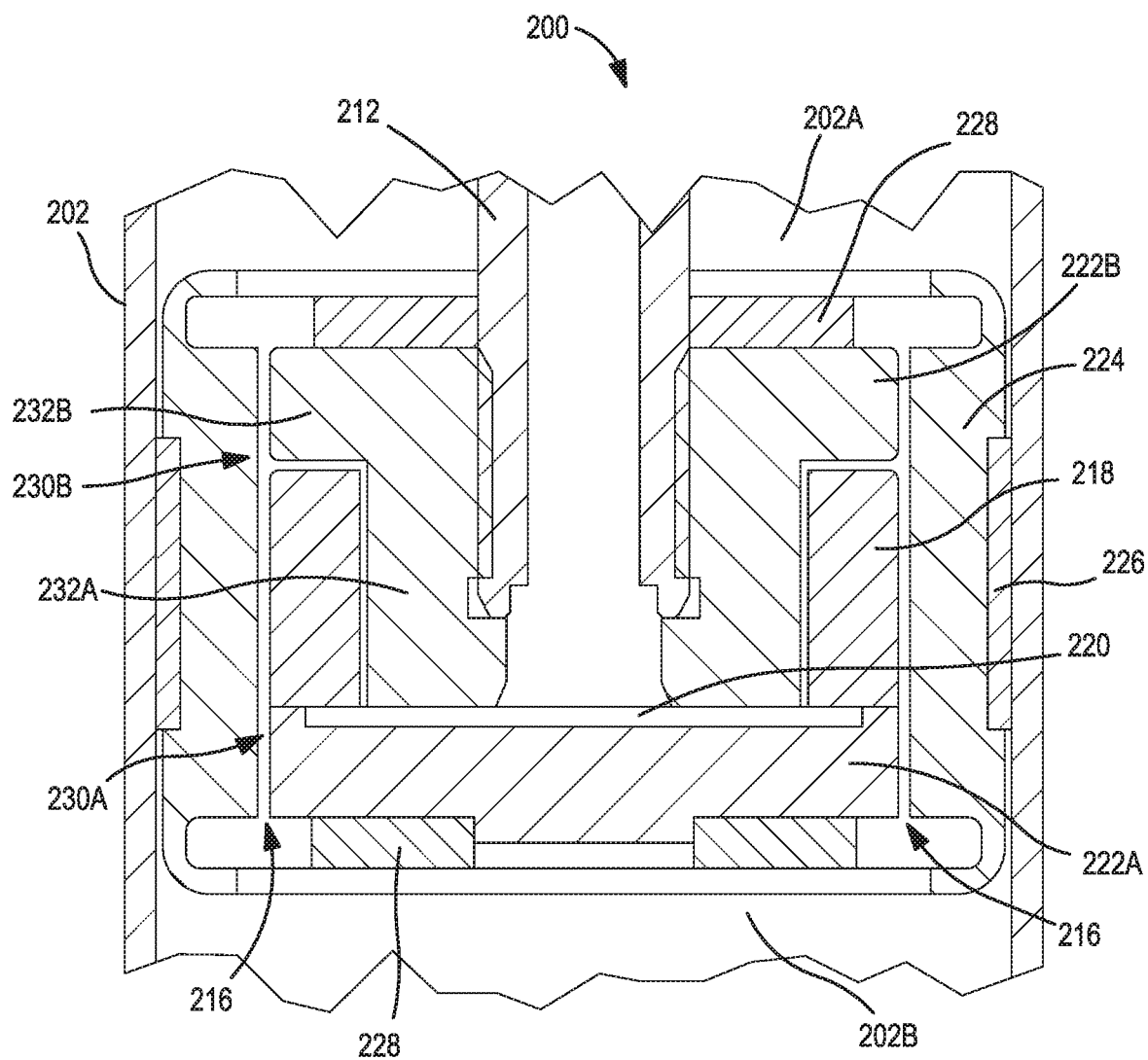
FIG. 3D is a detailed cross-sectional view at detail 3D, shown in FIG. 3C, of the example embodiment of the seat-damping device of FIG. 3A in accordance with the disclosure herein.

In some aspects, piston head 214 has an orifice, generally designated 216, extending axially therethrough. Orifice 216 is disposed between a coil 218 and a flux ring 224. In this configuration, orifice 216 acts as a valve or channel through which MR fluid flows when piston 214 is displaced axially relative to housing 202. For example, when a compressive force is applied to piston 210, MR fluid flows from lower interior chamber 202B into upper interior chamber 202A via orifice 216. First and second active regions, generally designated 230A and 230B, respectively, are provided at either end of orifice. Referring to FIG. 3D, first active region 230A is disposed in orifice 216 proximate where orifice 216 opens into lower chamber 202B and between a surface of bottom pole 222A and a surface of flux ring 224. Second active region 230B is disposed in orifice 216 proximate where orifice 216 opens into upper chamber 202A and between a surface of a top pole 222B and the surface of flux ring 224. Permanent magnet 220, discussed in further detail below, generates a permanent magnetic field at first and second active regions 230A and 230B of orifice 216, which provides a baseline magnetic field to "energize" the MR fluid adjacent to first and second active regions 230A and 230B in upper and/or lower chambers 202A and 202B. In some embodiments, coil 218 is configured to produce a magnetic field or flux path for supplementing, either positively or negatively, the existing permanent magnetic field, thereby adjusting the degree that the MR fluid is energized at the active regions 230A and 230B of orifice 216.

The MR fluid inside housing 202 may be any of a variety of materials responsive to and/or actuated by a magnetic field, such as a fluid containing ferrous material. The properties of the MR Fluid are determined by the concentration of the materials responsive to and/or actuated by a magnetic field. In some embodiments, MR fluid includes soft-magnetic or magnetizable particles dispersed within a carrier material (e.g., a liquid or gas). In other embodiments, MR fluid includes a dry MR powder including magnetizable particles that are not dispersed within a liquid or oil carrier. In some other embodiments, the magnetizable particles of material include carbonyl iron, stainless steel, and/or any of a variety of other magnetic material having various shapes, not limited to a spherical shape. In still other embodiments, MR fluid includes an MR powder having magnetizable particles of any suitable size, for example, particles having a mean diameter of about 0.1 µm to about 500 µm, and any size(s) and/or range of size(s) therebetween. In yet other embodiments, MR fluid comprises any of a variety of commercially available MR fluid in various formulations, such as those available from LORD Corporation of Cary, N.C.

Coil 218 is formed as a toroidal or otherwise annular shaped ring of wound material. Coil 218 may be composed of any suitable material, including, for example, copper, copper alloys or any electrically conductive material. Coil 218 includes an electromagnetic material for inducing an electromagnetic field. Coil 218 is in electrical communication with a control unit (e.g., current controller 404, see FIG. 5) which is configured to control current communicated to coil 218, thereby controlling the electromagnetic field produced by coil 218. Coil 218 is connected to control unit (not shown in FIGS. 3A through 3D) via leads 204. Accordingly, when current is circulated through coil 218 from leads 204 a current-induced magnetic field of a particular strength and polarity is produced that is operable to suppress and/or augment the permanent magnetic field generated by permanent magnet 220, which is shown as being housed within seat-damping device 200. The permanent magnet 220 provides for a fail-safe mode when the current-induced magnetic field is off or non-functioning. When the current provided to coil 218 is adjusted by a control unit, the state of the MR fluid, particularly the MR fluid yield strength, which yields in shear, disposed within housing 202 changes, thereby adjusting the effective flow rate of the MR fluid through orifice 216. The state change of the MR fluid is when the particles in the MR fluid align and increase the MR fluid yield strength, but the viscosity of the MR fluid remains constant. For example, providing a magnetic field at the active regions 230A and 230B of orifice 216 energizes magnetically responsive material in the MR fluid near these regions, such that the energized particles of the MR fluid align, thereby increasing the MR fluid yield strength. By magnetically energizing the MR fluid and aligning the magnetically activated particles therein, the shear strength of the MR fluid is increased and the flow rate through orifice 216 decreases accordingly. In this case, the net magnetic field at the active regions 230A and 230B of orifice 216 is stronger (e.g., the permanent magnetic field and the current-induced magnetic field combine to generate a net magnetic field with a greater magnitude than that of just the permanent magnetic field). The current-induced magnetic field produced by coil 218 is selectively adjustable by changing the current applied to coil 218, thereby adjusting the current-induced magnetic field and the flow rate of MR fluid through orifice 216. Non-energized MR fluid (e.g., where net magnetic field at the active regions is approximately zero) has the lowest yield strength and, accordingly, the highest flow rate through orifice 216, as non-energized MR fluid has little to no yield strength (e.g., shear resistance). The magnetically responsiveness of the magnetically responsive material in the MR fluid is predetermined by a manufacturer, operator or user of the seat-damping device 200.

Referring now in more detail to FIGS. 3C and 3D, piston head 214 includes permanent magnet 220, coil 218, bottom pole 222A, top pole 222B, and flux ring 224, which are held together by end plates 228 disposed on both axial sides thereof. Top pole 222B comprises a substantially 'T' shaped cross-section, as illustrated in FIGS. 3C and 3D, however top pole 222B may be any suitable cross-sectional shape. In the illustrated configuration, a first portion 232B of top pole 222B has a diameter larger than a second portion 232A thereof. Top pole 222B has a diameter which is substantially similar to the diameter of bottom pole 222A. The first portion 232B of top pole 222B is substantially horizontal and parallel to bottom pole 222A. The second portion 232A of top pole 222B is substantially vertical and perpendicular to bottom pole 222A. Bottom pole 222A and/or top pole 222B may comprise any suitable magnetic material. Furthermore, bottom and top poles 222A and 222B may be sized and/or shaped in any way that promotes a desired flow of MR fluid through orifice 216.

Referring to FIG. 3D, flux ring 224 is disposed around outer surfaces of coil 218, magnet 220, bottom pole 222A, and top pole 222B, such that flux ring 224 is disposed between orifice 216 and an interior of housing 202. Flux ring 224 is spaced apart from the interior of housing 202 by a wear band 226, which may comprise nylon or any suitable low friction material to prevent direct friction between piston head 214 and housing 202. In some configurations, flux ring 224 is formed as a metallic sleeve 224 that acts to provide a path for magnetic flux to complete the magnetic circuit provided within housing 202 and enable energization of the MR fluid by the net magnetic field.

A vehicle may be in an operating state where no power is supplied to leads 204, such that no current is provided to coil 218. In such a case, a current-induced magnetic field is not generated by coil 218 and only permanent magnet 220 produces a magnetic field, thus providing a baseline damping force, regardless of whether any current is supplied to coil 218. As is illustrated in FIGS. 3C and 3D, permanent magnet 220 is disposed between bottom pole 222A and top pole 222B.

Figure 4A:
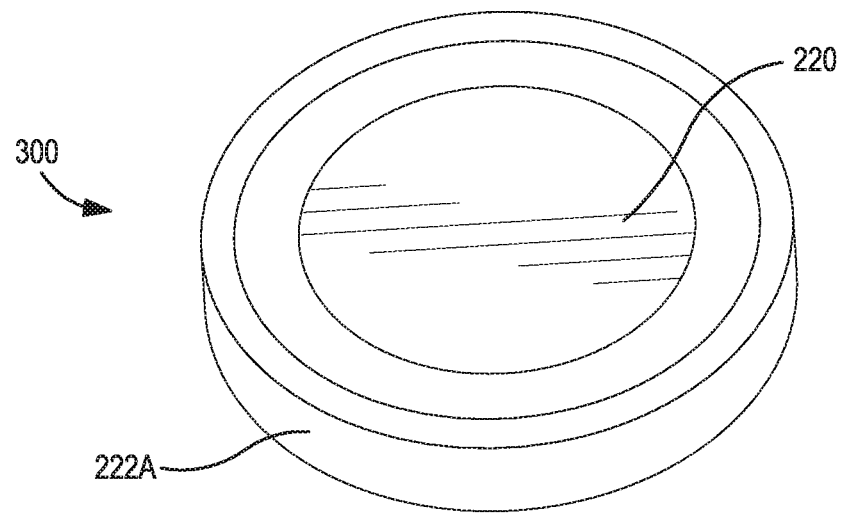
FIG. 4A is a perspective view of an example embodiment of a bottom pole for a seat-damping device in accordance with the disclosure herein.
Figure 4B:
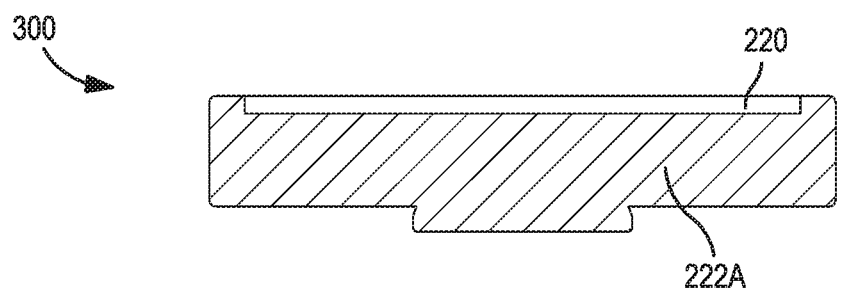
FIG. 4B is a cross-sectional view of the bottom pole of FIG. 4A in accordance with the disclosure herein.

In some embodiments, permanent magnet 220 is integral or otherwise manufactured with bottom pole 222A. FIGS. 4A and 4B each illustrate permanent magnet 220 being integral with bottom pole 222A. FIG. 4A is a top perspective view, showing permanent magnet 220 integrated into bottom pole 222A as a fabricated unit 300. In some other embodiments, a bottom pole of an existing seat-damping device may be modified to receive a magnet, e.g., permanent magnet 220, whereas, in other embodiments, a seat-damping device is manufactured with permanent magnet 220 already integrated into a bottom pole. In some preferred embodiments, permanent magnet 220 comprises a neodymium (NdFeB) magnet, which may be of varying grades depending upon the application, such as, for example, an N42 or N52 disk magnet. A higher-grade magnet designator indicates a magnet capable of providing a stronger magnetic field. For example, an N52 magnet provides a stronger magnetic field than an N42 magnet. However, a weaker magnet (e.g., N42) usually generates a weaker magnetic field than a stronger magnet (e.g., N52) such that less current may be needed to generate an induced magnetic field that is sufficient to cancel out the permanent magnetic field. As a result, less energy (e.g., heat) need be generated by seat-damping device 200 in such instances where the current-induced magnetic field is generated to weaken or counteract entirely the permanent magnetic field. This is advantageous in some applications, as high steady state temperatures (e.g., up to about 284° F./140° C.,) may be generated where current is constantly supplied to coil 218. Thus, in some embodiments, it is beneficial to use a weaker magnet such as an N42 magnet for seat-damping applications using devices and systems described herein. Regardless of the permanent magnet 220 used, it still provides for a fail-safe mode when the current-induced magnetic field is off or non-functioning.

FIG. 4B illustrates a cross-sectional view of permanent magnet 220 integrated into bottom pole 222A as a fabricated unit 300. Permanent magnet 220 is sized to be integrated within a diameter of bottom pole 222A. In a non-limiting example, permanent magnet 220 may have a diameter of about 0.75 inches (about 1.9 cm) and a thickness of about 0.032 inches (about 0.081 cm). To accommodate permanent magnet 220, bottom pole 222A is cut back or otherwise modified such that permanent magnet 220 is able to be press fit or otherwise integrated into bottom pole 222A. In the example configuration illustrated in FIG. 4B, bottom pole 222A has a partial bore having dimensions of about 0.75±0.0005 inches (about 1.9±0.0013 cm) in diameter and about 0.032±0.0005 inches (about 0.081±0.0013 cm) in thickness. Tolerances of the bore formed in bottom pole 222A may range between about 0.0015 inches (about 0.0038 cm) to about 0.0005 inches (about 0.0013 cm). Accordingly, bottom pole 222A has a bore sized to receive permanent magnet 220 such that a top surface of permanent magnet 220 is substantially flush and/or coplanar with a remaining top surface of bottom pole 222A, and an outer diameter of permanent magnet 220 is substantially flush with a diameter of the bore. The example dimensions and orientations provided herein are merely illustrative and in no way limit the dimensions of any such structures of the seat-damping device.

Permanent magnet 220 comprises a disk magnet having an axial magnetization direction with poles being located on opposing flat surfaces. For example, a south pole is located at a bottom surface and a north pole is located at a top surface of permanent magnet 220. Therefore, when permanent magnet 220 is integrated into bottom pole 222A of seat-damping device 200, the poles of permanent magnet 220 align with a direction of coil wind of coil 218. In such a manner, adjusting a magnitude and/or polarity of the current-induced magnetic field based upon the direction of current supplied to coil 218, the current-induced magnetic field counteracts the permanent magnetic field generated by permanent magnet 220. This results in a net magnetic field strength at the active regions 230A and 230B of orifice 216 having the combined strengths of the permanent magnetic field and the current-induced magnetic field. Accordingly, since a damping force is dependent on net magnetic field strength and the permanent magnetic field remains constant, the damping force generated by seat-damping device 200 is adjustable by changing the magnitude and the polarity of the current-induced magnetic field based upon the direction of current applied to coil 218 and, accordingly, the field strength of the current-induced magnetic field. Additionally, in embodiments where the state, including the fluid yield strength, of the MR fluid is adjustable incrementally over a substantial range, adjusting the supply of current to the coil 218 likewise adjusts the damping force achievable by seat-damping device 200 over a substantial range. As discussed above, the permanent magnet 220 provides for a fail-safe mode when the current-induced magnetic field is off or non-functioning.

Figure 5:
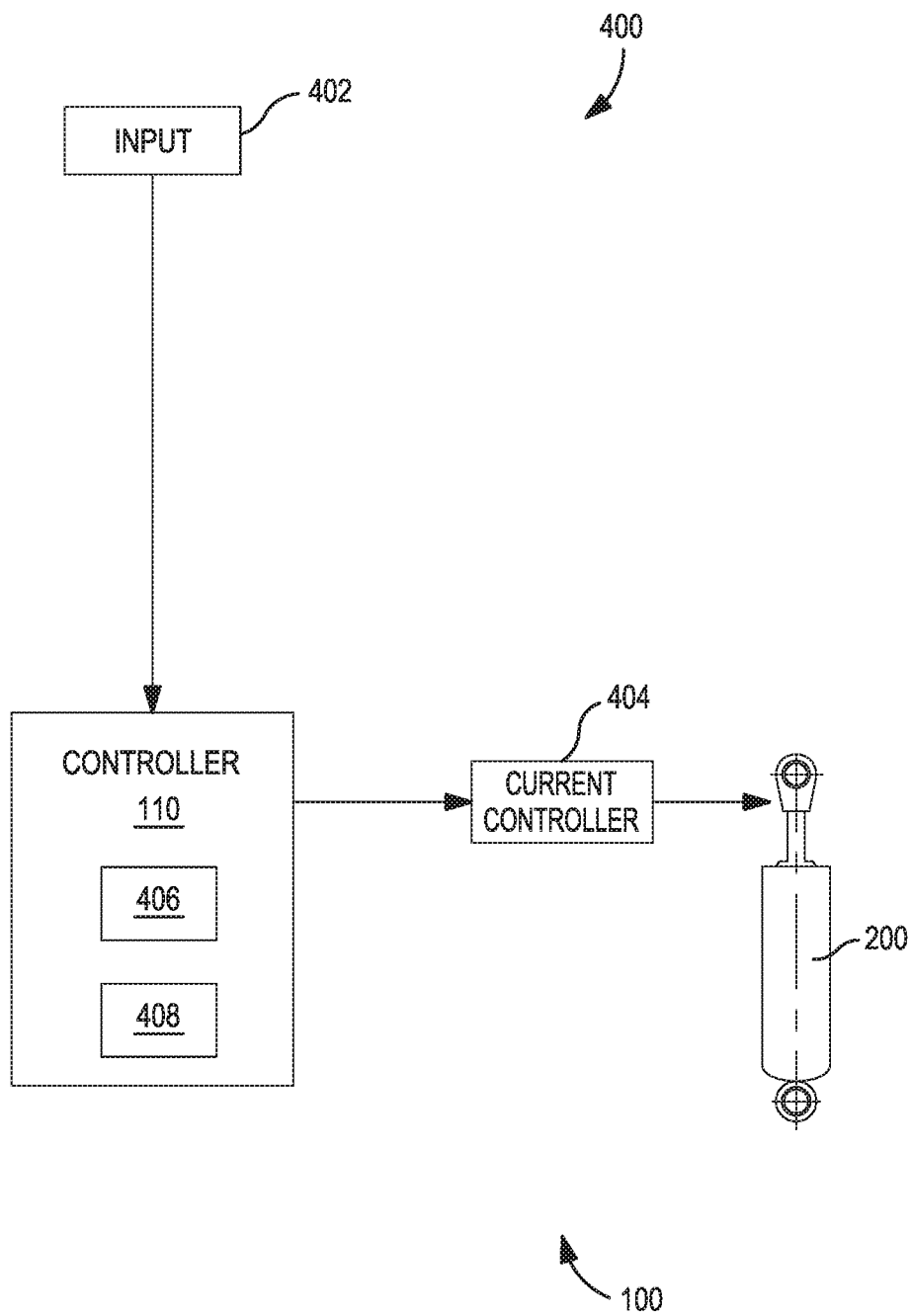
FIG. 5 is a schematic block diagram of an example embodiment of a seat-damping system in accordance with the disclosure herein.

Referring now to FIG. 5, a schematic block diagram 400 of an example embodiment for seat-damping system 100 is illustrated. Seat-damping system 100 includes controller 110 for receiving an input 402 (e.g., sensors 112) for controlling seat-damping device 200, described above. A current controller 402 for adjusting a current supplied to coil 218 of seat-damping device 200 is in electronic communication with controller 110. Controller 110 is configured with a variety of controls, including, for example, a ride mode switch, a seat-leveling switch, etc., to adjust a seat occupant's riding comfort in a vehicle. For example, a ride mode switch within easy reach of the seat occupant allows for manipulation by the seat occupant before, during, or after operation of the vehicle. By manipulating one of these switches, a seat occupant may alter operational parameters stored in controller 110. In some embodiments, controller 110 is configured with additional sensors, switches, controls, etc., to provide additional input 402 to the system or enable enhancements to the existing operational parameters of seat-damping system 100. For example, a brake sensor, clutch sensor, seat occupant sensor, steering angle sensor, gearshift position sensor, speed sensor, rollover sensor, etc., may provide sensory input to alter or adjust a damping force generated by seat-damping device 200.

Controller 110 comprises at least one hardware processor 406 and a memory 408. As such, controller 110 is configured to perform calculations using input 402 to determine an appropriate damping force output and to determine a required current magnitude and polarity needed to suppress or augment the magnetic field generated by permanent magnet 220. In some configurations, permanent magnet 220 provides a permanent, mid-range magnetic field independent of controller 110, which also provides for a fail-safe mode for seat damping device 200. For example, while the current provided to coil 218 is controllable by controller 110 and/or current controller 404, permanent magnet 220 provides a permanent magnetic field and functions as a fail-safe for seat-damp device 200 regardless of an operational mode of controller 110 and/or current controller 404.

Figure 6A:
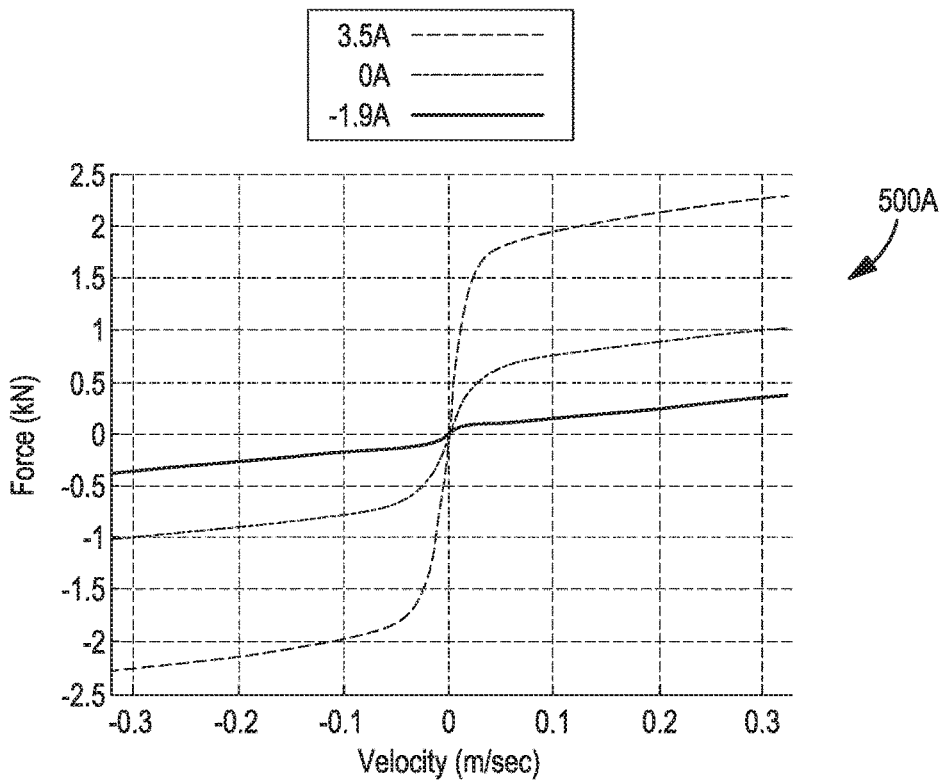
FIG. 6A is a graphical illustration of force versus velocity for an example embodiment of a seat-damping device or system in accordance with the disclosure herein.

In some embodiments, the permanent magnetic field generated by permanent magnet 220 is configured to provide passive damping between a minimum and maximum achievable damping force of seat-damping device 200, such as shown in FIG. 6A. According to one example embodiment, when controller 110 and/or current controller 404 are not supplying any current to coil 218 (e.g., current=0 A), permanent magnet 220 provides a non-variable or constant magnetic flux at the active regions 230A and 230B of orifice 216 of between about 0.33 Tesla (T) and about 0.45 T. This corresponds to a permanent magnetic field of between about 65,000 Amperes/meter (A/m) and about 100,000 A/m at the active regions of the orifice 216 and is directly proportional to an initial knee force for the seat-damping device 200 of about 0.64 kilo Newtons (kN) (see, e.g., FIG. 6B).

Figure 6B:
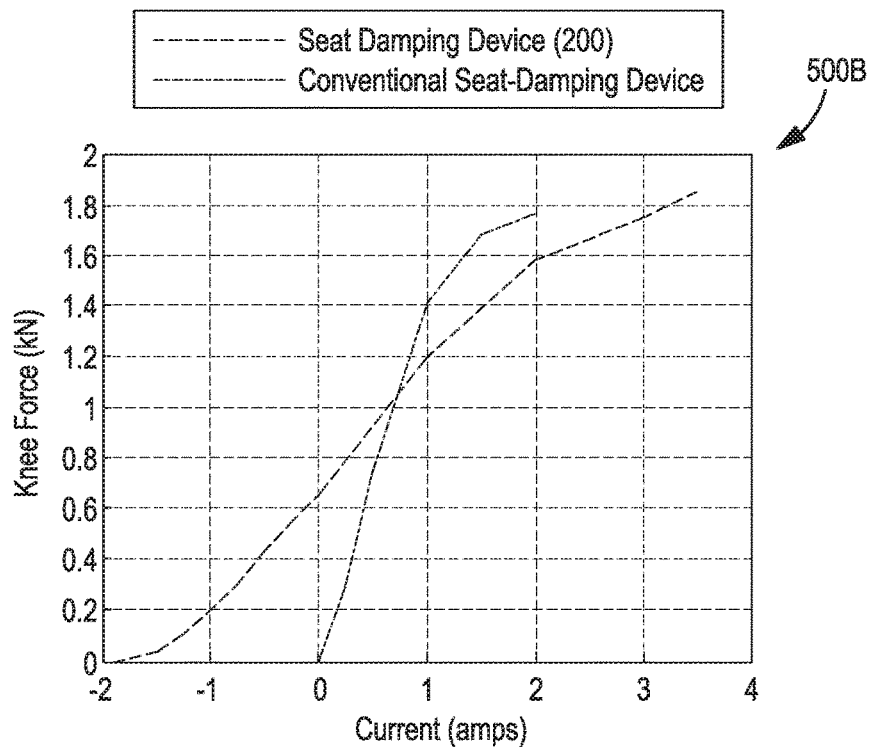
FIG. 6B is a graphical illustration of knee force versus current for an example embodiment of a seat-damping device or system in accordance with the disclosure herein.

In one embodiment, damping force output measured in kN and generated by seat-damping device 200 is equivalent to Equation 1:

Damping Force Output (kN)=Knee Force (kN)+level of damping (kN/(m/s))*velocity of piston (m/s)   EQ 1:

In the aforementioned embodiment, seat-damping device 200 is operable with an initial knee force of about 0.64 kN at 0 A, whereas, in conventional seat-damping devices, there will be no initial knee force generated at 0 A (see FIG. 6B). In such a situation, only permanent magnet 220 generates a magnetic field, which causes seat-damping device 200 to begin initial generation of a damping force at the initial knee force, e.g., 0.64 kN, rather than at 0 kN, once linear behavior of the damping device occurs, i.e., a certain velocity is reached. However, where the only magnetic field provided in seat-damping device 200 comes from permanent magnet 220, the knee force provided by seat-damping device 200 will remain constant and function as a fail-safe. To increase or decrease the damping force output where the vibrations transmitted to seat 102 exceed or are less than a damping force generated by the permanent magnet alone, controller 110 and/or current controller 404 are operable to determine an appropriate magnitude and polarity of the current-induced magnetic field based upon the direction of current to be supplied to coil 218. The increase or decrease to the damping force is adjusted by increasing or decreasing the magnitude of the current supplied to coil 218, or by reversing the current supplied to coil 218. This increase or decrease of current adjusts the magnitude of the magnetic field generated by coil 218. When the polarity of permanent magnet 220 is opposite from the polarity of the magnetic field generated by coil 218, the magnetic field of permanent magnet 220 is subtracted from the magnetic field generated by coil 218. When the polarity of permanent magnet 220 is aligned with the polarity of the magnetic field generated by coil 218, the magnetic field of permanent magnet 220 is added to the magnetic field generated by coil 218.

In addition, a level of damping of seat-damping device 200 measured in kN/(m/s) is found by taking a slope of the force versus velocity curve (see, e.g., FIG. 6A). Generally, the level of damping of seat-damping device 200 is constant regardless of what level of current is supplied. It is the initial knee force that is affected by different levels of current supplied (see, FIG. 6A). This is shown in one example embodiment, with the level of damping of seat-damping device 200 being between about 1 kN/(m/s) and about 1.2 kN/(m/s), regardless of whether current is −1.9 A, 0 A, 3.5 A, etc.

Controller 110 is configured to determine instances when seat 102 requires only a lowest or "off-state" damping force to be generated by seat-damping device 200. In such a situation, an off-state level is achieved by controller 110 and/or current controller 404 supplying coil 218 with current to create a current-induced magnetic field sufficient to drive the permanent magnetic field generated by permanent magnet 220 towards 0 A/m at active regions 230A and 230B of orifice 216. In an example embodiment, controller 110 and/or current controller 404 are configured to supply coil 218, which is wound counterclockwise, with between about −1.0 A and about −2.0 A of current, depending on the grade of magnet selected and specific dimensional geometry, to at least partially cancel out the permanent magnetic field of between about 65,000 A/m and about 100,000 A/m generated by permanent magnet 220 at active regions 230A and 230B of orifice 216. In this example embodiment, a current of about −1.9 A may be supplied for this purpose. In this example embodiment, the net magnetic field strength at active regions 230A and 230B of orifice 216 is between about 5,000 A/m and about 6,000 A/m, with a corresponding magnetic flux of between about 0.03 T to about 0.04 T.

Controller 110 is further configured to determine instances when seat 102 requires a maximum damping force to be generated by seat-damping device 200. In such a situation, a maximum damping force is achieved by controller 110 and/or current controller 404 supplying coil 218 with current to create a current-induced magnetic field sufficient to augment the permanent magnetic field generated by permanent magnet 220 at active regions 230A and 230B of orifice 216. Still referring to the example embodiment described immediately above, controller 110 and/or current controller 404 are configured to supply coil 218, which is wound counterclockwise, with about 3.5 A of current to augment the permanent magnetic field of between about 65,000 A/m and about 100,000 A/m generated by permanent magnet 220 at active regions 230A and 230B of orifice 216. In this example embodiment, the net magnetic field strength is between about 298,000 and 333,000 A/m, with a corresponding magnetic flux of about 0.6 T at active regions 230A and 230B of orifice 216. Although the theoretical magnetic flux of a corresponding magnetic field of between about 298,000 A/M and about 333,000 A/m should be between about 0.75 T and about 0.84 T, saturation of the MR fluid generally occurs at about 0.6 T. Thus, coil 218 is only able to add to the permanent magnetic field up to the point of saturation at about 0.6 T. In some embodiments, seat-damping device 200 and/or system 100 are configured to provide a maximum damping force, such as shown in FIG. 6A, at a lower current setting than other conventional seat-damping devices and/or systems. In this case, the magnitude of current supplied to the system is mitigated by the already existing permanent magnetic field generated by permanent magnet 220.

Controller 110 is also configured to determine instances when seat 102 requires generation of a damping force between off-state damping and maximum damping. In such a situation, a mid-range damping is achieved by a determination of whether any current needs to be supplied to coil 218. Since permanent magnet 220 provides a constant magnitude permanent magnetic field, controller 110 is configured to determine if a damping force required to counteract vibrations transmitted to seat 102 is greater or less than the damping provided by the permanent magnet alone. If the needed damping force is substantially equal to the damping provided by the permanent magnet alone, then no current needs to be supplied to coil 218. In this example, seat-damping device 200 may provide a net magnetic field strength of between about 65,000 A/m and about 333,000 A/m and a corresponding magnetic flux of between about 0.33 T and about 0.6 T at the active regions of orifice 216. Conversely, controller 110 and/or current controller 404 is configured to supply a current in an appropriate or sufficient magnitude and polarity for adjusting the net magnetic field. For example, an appropriate or sufficient magnitude and polarity of the current-induced magnetic field based upon the direction of current direction of current supplied to coil 218, the current-induced magnetic field is sufficient to achieve a level of desired damping to overcome a certain level of vibration encountered. In this manner, controller 110 and/or current controller 404 are configured to supply a magnitude and direction of current over a range to damp an equally significant range of vibrations transmitted to seat 102. In this example embodiment, between about −2.0 A and about 5.0 A of current may be supplied to coil 218. Since a damping force output by seat-damping 200 is dependent on a net magnetic field strength at active regions 230A and 230B of orifice 216, then adjusting the net field strength, via adjusting magnitude and direction of current supplied to coil 218, will similarly adjust the output damping force by increasing or decreasing the initial knee force (see, e.g., FIG. 6B).

Referring back to FIG. 6A, the example graphical illustration, generally designated 500A, of force versus piston velocity for an example embodiment of seat-damping system, e.g., seat-damping system 100, is illustrated. Three example different magnitudes and polarities of current applied to seat-damping system 100 illustrate how varying the current applied to coil 218 affects the damping force output by seat-damping system 100. In view of Equation 1, while the damping force output by seat-damping system 100 varies, the level of damping remains relatively constant regardless of the current applied to the system. For example, in each of the three curves, the level of damping is between about 1 kN/(m/s) and about 1.2 kN/(m/s). As illustrated in FIG. 6B, the initial knee force for each curve changes dramatically depending on the magnitude and direction of current applied to coil 218 of seat-damping system 100, which in turn determines the damping force output by seat-damping system 100.

Still referring to FIG. 6A, the damping force (kN) versus the velocity (meters/second) is illustrated for three different current values (Amperes). Each of the current values is plotted based upon empirical test results of a model of the example embodiment, with a maximum and a minimum damping force shown for each current. The theoretical maximum damping force is defined by extrapolating the 3.5 A curve out to the maximum working velocity of piston 210 in seat-damping device 200. From FIG. 6A, and the associated empirical testing of the example embodiment, the maximum damping force achievable by this embodiment of seat-damping device 200 will be about 2.5 kN at a maximum positive piston 210 velocity. Similarly, the minimum damping force is about zero (0) kN at a piston 210 velocity of zero (0) msec. However, the minimum damping force for seat-damping device 200 will be about 0.5 kN at its maximum positive piston 210 velocity. Additionally, similar maximum and minimum damping forces are found for the maximum and minimum negative piston 210 velocities. In this case, the maximum damping force achievable by seat-damping device 200 will be about −2.5 kN at its maximum negative piston 210 velocity and the minimum damping force for seat-damping device 200 will be about −0.5 kN at its maximum positive piston 210 velocity.

FIG. 6A provides a sample of test results for an example embodiment of seat-damping device 200, where the minimum achievable damping force of seat-damping device 200 as being approximately −0.4 kN at about −0.3 meters per second (m/s) and approximately 0.4 kN at about 0.3 m/s. In this example embodiment, a current of about −1.9 A is applied to coil 218. However, an approximate linear extrapolation of the −1.9 A curve in FIG. 6A shows a relationship of increasing damping force and increasing velocity. Similarly, the maximum damping force of seat-damping device 200 is illustrated, with a current of approximately 3.5 A applied to coil 218, as being approximately −2.25 kN at about −0.3 m/s and approximately 2.25 kN at about 0.3 m/s. The same conclusion regarding a linear extrapolation discussed above for the −1.9 A curve applies to the 3.5 A curve, such that such a linear extrapolation discloses a relationship of increasing damping force and increasing velocity. Those having skill in the art understand that the curves in FIG. 6A illustrate a probable maximum and minimum value for one embodiment of seat-damping device 200. Those having skill in the art also understand the embodiment is merely exemplary. As such, the magnitudes, as well as the other characteristics of the plots, may be changed greatly by altering the size, arrangements, and characteristics of the components of any seat-damping device, in accordance with the disclosure herein.

In FIG. 6A, the 0 A curve illustrates a stiffened state for the example embodiment of seat-damping device 200 even when no current is provided to coil 218 of the seat-damping device 200 and/or seat-damping system 100. For example, the 0 A curve illustrates a level of damping of between about 1 kN/(m/s) and about 1.2 kN/(m/s) with an initial knee force of about 0.64 kN (see FIG. 6B) that is generated even when no current is supplied to coil 218. Thus, the damping force generated by seat-damping system 100 varies as the velocity of piston 210 increases. In this embodiment, seat-damping system 100 is capable of generating a damping force output regardless of whether any current or other form of power is supplied to the system.

FIG. 6A also illustrates how application of a negative current (e.g., −1.9 A) affects the damping force output of seat-damping system 100. Where a level of damping for the system is generated based solely on a permanent magnet 220, reversing a polarity of the current supplied to the system results in supplying a negative current, such that the level of damping of the system is driven towards minimum damping, e.g., 0 kN/(m/s). A minimum level of damping for the current applied to coil 218 is dependent upon the piston 210 velocity, such as is shown in FIG. 6A. One non-limiting example of a minimum level of damping is illustrated in FIG. 6A where the minimum damping force is about 0.3 kN at about 0.3 m/sec with −1.9 A applied to coil 218. However, that minimum level of damping is based upon the particular piston 210 velocity and the forces associated with the particular seat-damping system 100. As those skilled in the art know, FIG. 6A represents examples of damping forces and currents applied to an example coil, and is not limiting, as it will be understood that such forces, currents, and velocities may be altered.

In some aspects, a greater in magnitude negative current supplied by controller 110 results in driving the damping force output closer to a minimum level of damping, as compared to a lesser magnitude negative (e.g., closer to 0) current. For example, the −1.9 A curve illustrates how supplying, by controller 110 and/or current controller 404, a −1.9 A current results in a level of damping of about 0.3 kN at about 0.3 m/sec velocity and about −0.3 kN at about −0.3 m/sec velocity. When frictional effects are accounted for in this minimum level of damping value, the minimum damping is about 0.3 kN at a velocity of about 0.3 m/sec with an initial knee force of about 0.1 kN (see FIG. 6B). Thus, the damping force generated by seat-damping system 100 at −1.9 A will vary slightly as velocity of piston 210 changes from 0 m/s. For example, a minimum damping force output generate by the example embodiment seat-damping system 100 may be 0.35 kN at −1.9 A. In this manner, by increasing the magnitude of the negative current, a damping force output for seat-damping system 100 is driven to minimum or off-state damping.

FIG. 6A also illustrates how application of a positive current affects the damping force output of seat-damping system 100. Where a damping force for seat-damping system 100 is generated using solely permanent magnet 220, applying a positive current to coil 210 results in driving the damping force of the system towards a maximum level of damping. For example, the 3.5 A curve illustrates how supplying, by controller 110 and/or current controller 404, a 3.5 A current to coil 218 results in a level of damping of between about 0.94 kN/(m/s) and about 1.05 kN/(m/s) with an initial knee force of about 1.85 kN (see FIG. 6B). Thus, the damping force generated by system 100 at 3.5 A will vary as the velocity of piston 210 increases from 0 m/s. For example, a maximum damping force output by the example embodiment of seat-damping system 100 may be between about 2 kN and about 2.25 kN at about 3.5 A, where 3.5 A is a point of saturation. It will be understood by those of ordinary skill in the art that the minimum and maximum damping force output values can be altered by routine modification of the components of seat-damping device 200 and/or system 100. Referring to FIGS. 6A and 6B, by increasing the magnitude of the positive current, a damping force output for seat-damping system 100 is driven to provide a maximum damping at a lower current setting as compared with conventional seat-damping systems taught by the prior art. This is a result of the magnitude of current supplied to coil 218 being reduced by the already existing and constant permanent magnetic field generated by permanent magnet 220.

Referring now to FIG. 6B, a graphical illustration, generally designated 500B, of initial knee force versus current for an exemplary seat-damping system, e.g., seat-damping system 100, compared to a conventional seat-damping system is illustrated. Taken in conjunction with FIG. 6A, the exemplary seat-damping system of the present subject matter has an initial knee force of about 0.64 kN where 0 A of current are supplied to coil 218. This is due to permanent magnet 220 that is capable of generating a damping force (as a result of the permanent magnetic field) without any power input (e.g., current) and function as a fail-safe for seat-damping device 200. By comparison, a conventional seat-damping system, e.g., one without a permanent magnet, comprises no initial knee force at 0 A. Thus, at a current value of 0 A, the example embodiment of seat-damping system 100 is capable of generating a constant damping force output that may be useful in a variety of applications, including off-highway commercial vehicle applications.

While the operational parameters discussed above are true for the example embodiment illustrated, seat-damping device 200 will be operational for any fluid having the relationship recited in Equation 2 below:

$$\frac{\tau_{MR}^2}{\eta} \approx 10^{10} \text{ Pa/s} \qquad \text{EQ 2}$$

$\tau_{MR}$ is defined as the fluid yield strength, which is controlled by the magnetic field (H), measured in Amperes per meter (A/m). "η" is defined as the viscosity of the fluid. For MR fluids suitable for use in such seat-damping devices, the fluid yields in shear and, as such, the yield strength is a shear yield strength. As long as the MR fluid within seat-damping device 200 satisfies the relationship defined in Equation 2, the seat-damping device will be operational. To satisfy the requirements of Equation 2, parameters such as electrical current and maximum damper force will be determined based on the shear yield strength needed to maintain the relationship specified in Equation 2. It should be further noted that the features and characteristics of the fail-safe seat-damping device 200 according to the example embodiments presented and discussed herein can be applied to a wide range of sizes for a seat-damping device, capable of generating various levels of damping, damping heavier loads, etc.

Figure 7A:
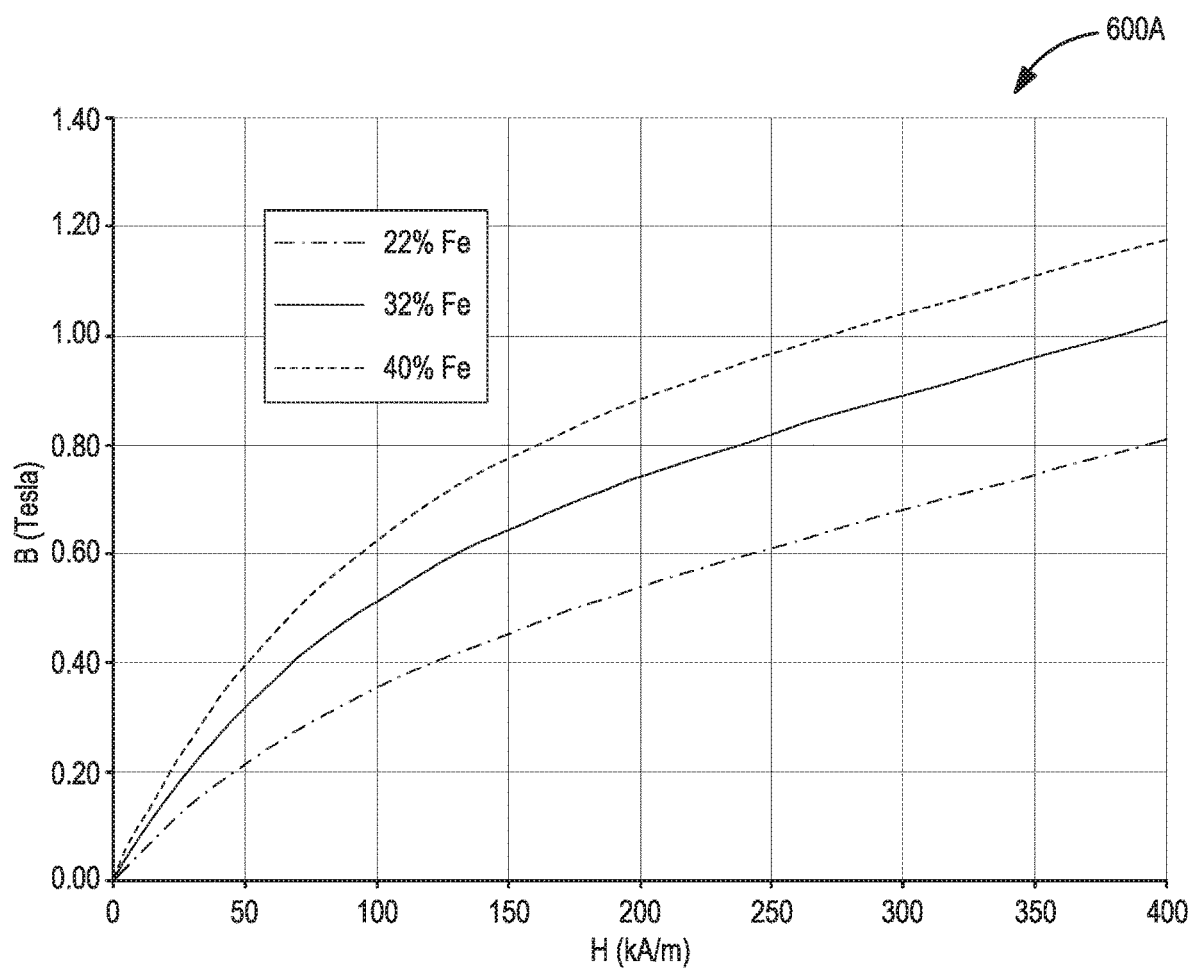
FIG. 7A is a prior art graphical illustration of magnetic flux (B) v. magnetic field strength (H) for several MR fluids suitable for use in a seat-damping device in accordance with the disclosure herein.
Figure 7B:
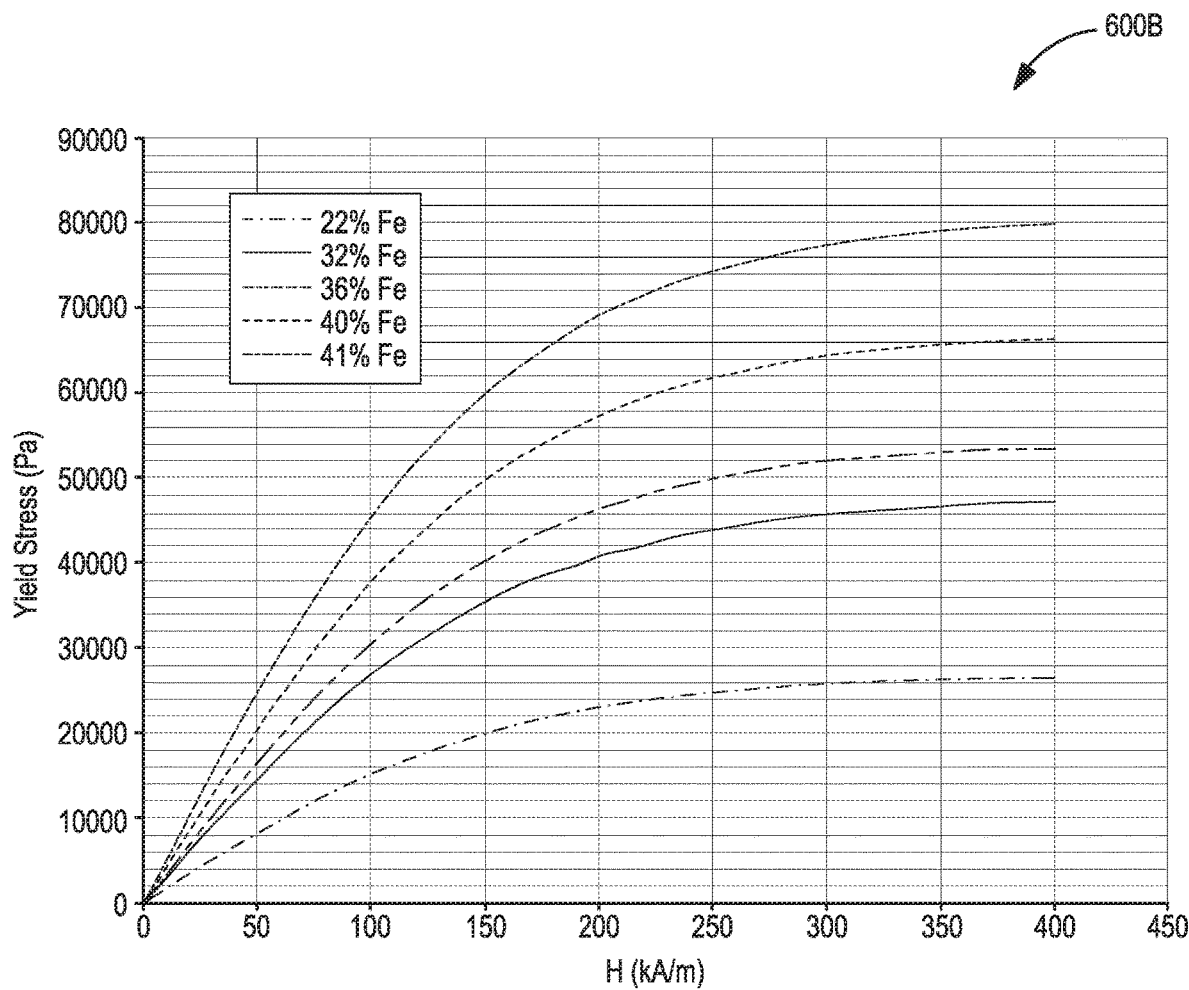
FIG. 7B is a prior art graphical illustration of Fluid yield strength v. magnetic field strength (H) for several MR fluids suitable for use in a seat-damping device in accordance with the disclosure herein.
Figure 7C:
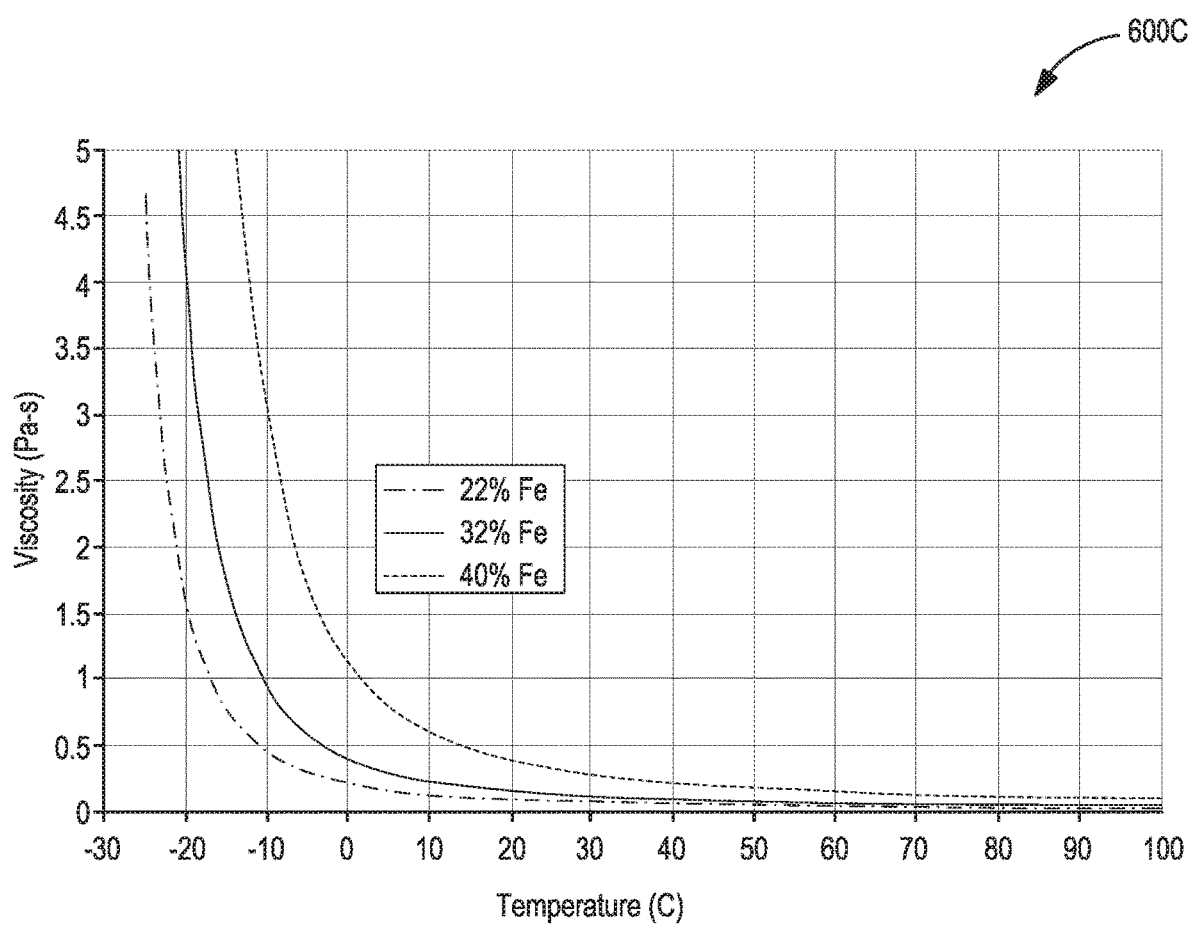
FIG. 7C is a prior art graphical illustration of MR fluid viscosity (q) v. temperature for several MR fluids suitable for use in a seat-damping device in accordance with the disclosure herein.

FIGS. 7A through 7C are prior art graphs illustrating the relationship of various parameters of the MR fluid. FIG. 7A is a graphical illustration, generally designated 600A, of the relationship of the magnetic flux density (B), measured in Tesla (T), is illustrated relative to the strength of the net magnetic field (H), measured in A/m, being generated by permanent magnet 220 and coil 218. The three curves illustrated herein correspond to three different MR fluids, with the percentage of ferrous material content of the fluid being 20%, 32%, and 40%, as indicated in the legend. FIG. 7B is a graphical illustration, generally designated 600B, of the relationship of the fluid yield strength, measured in Pascal (Pa), is illustrated relative to the strength of the net magnetic field (H), measured in A/m, being generated by permanent magnet 220 and coil 218. This relationship is plotted for five different MR fluid compositions, respectively having 22%, 32%, 36%, 40%, and 41% ferrous material content. It can be seen in both FIGS. 7A and 7B that, at a same magnetic field strength value, a higher ferrous material content of the MR fluid results in higher magnetic flux density and fluid yield strengths, respectively, compared to lower ferrous material MR fluids. FIG. 7C is a graphical illustration, generally designated 600C, of the relationship of the viscosity ($\eta$), measured in Pascal-seconds (Pa-s), and the temperature (° C.) of the MR fluid for three MR fluids of varying ferrous material content. As can be seen in FIG. 7C, the viscosity of the MR fluid increases as the ferrous material content thereof increases, yet the viscosity of any given MR fluid decreases as the temperature of the MR fluid increases.

Figure 8A:
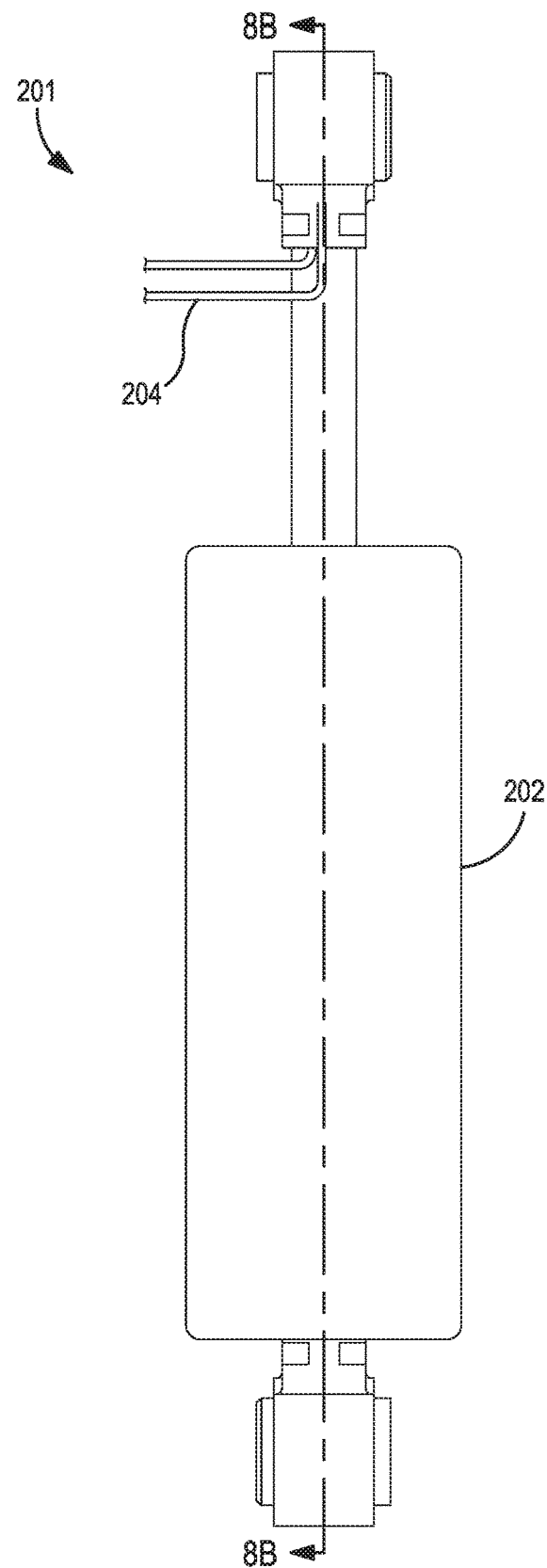
FIG. 8A is a side view of a second example embodiment of a seat-damping device in accordance with the disclosure herein.
Figure 8B:
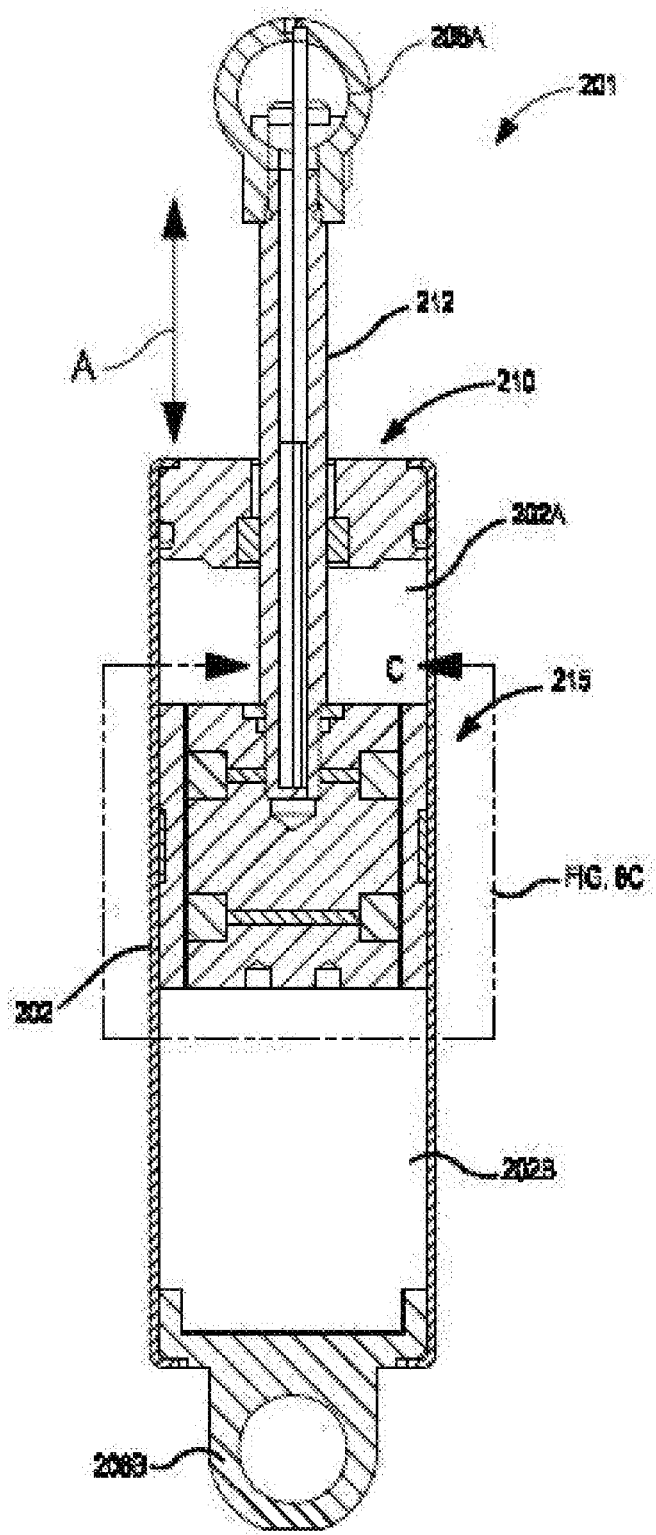
FIG. 8B is a cross-sectional along section line 8B-8B shown in FIG. 8A of the example embodiment of the seat-damping device of FIG. 8A in accordance with the disclosure herein.
Figure 8C:
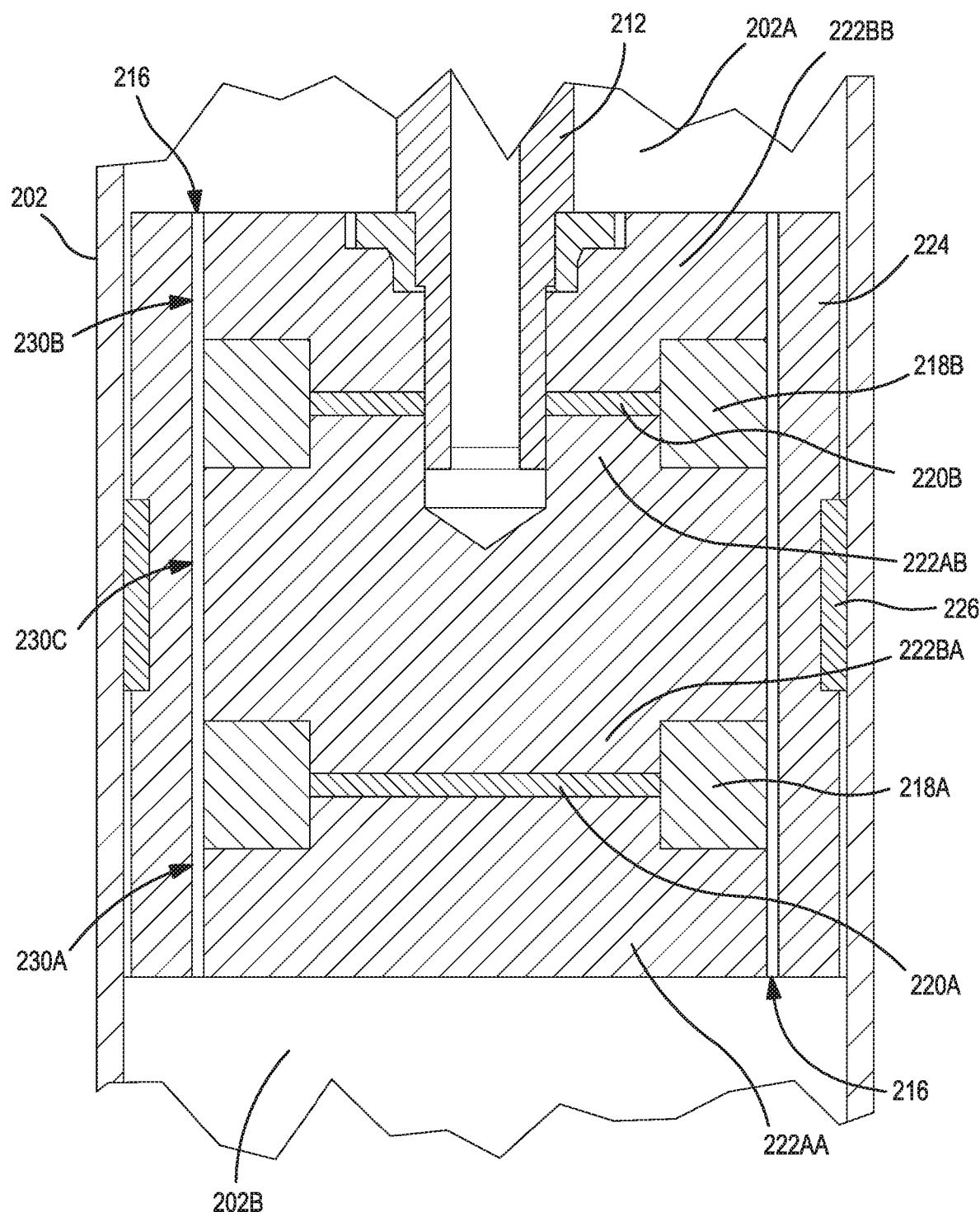
FIG. 8C is a detailed cross-sectional view at detail 8B, shown in FIG. 8B, of the example embodiment of the seat-damping device of FIG. 8A in accordance with the disclosure herein.

Referring to FIGS. 8A through 8C, a seat-damping device 201 is illustrated according to a two-coil alternative embodiment. As can be seen in FIG. 8A, seat-damping device 201 has a substantially similar external design as seat-damping device 200. As is shown in FIG. 8B and in further detail in FIG. 8C, seat-damping device 201 has lower and upper coils 218A and 218B, and lower and upper permanent magnets 220A and 220B. Flux ring 224 is disposed radially between lower and upper coils 218A and 218B and an interior surface of housing 202 and wear band 226 to prevent direct contact between flux ring and the interior surface of housing 202. Flux ring 224 and lower and upper coils 218A and 218B form orifice 216 therebetween. Seat-damping device 200 includes poles comprising top pole 222BB, bottom pole 222AB, top pole 222BA and bottom pole 222AA. The interior of housing 202 is subdivided into upper interior chamber 202A and lower interior chamber 202B, the dimensions of which are variable and depend on the position of piston head 214 relative to housing 202. Substantially all of upper and lower interior chambers 202A and 202B, as well as orifices 216 are filled with an MR fluid. As illustrated in FIG. 8C, a first active region, generally designated 230A, is disposed in orifice 216 proximate where orifice 216 opens into lower chamber 202B and between a surface of bottom pole 222AA and a surface of flux ring 224. A second active region, generally designated 230B, is disposed in orifice 216 proximate where orifice 216 opens into upper chamber 202A and between a surface of a top pole 222BB and the surface of flux ring 224. A third active region, generally designated 230C, is disposed in orifice 216 proximate the surface of bottom pole 222AB and a surface of top pole 222BA on one side and the surface of flux ring 224 on the other side. The two-coil design provides for increased force generation and, accordingly, damping by the creation of third active region 230C. Seat-damping devices and systems are not limited to the specific configurations recited herein, but may instead have other configurations, including variations in the number of permanent magnets, coils, and pistons employed, as will be readily understood by those having ordinary skill in the art.

FIG. 9 is an example flow diagram of a method, generally designated 800, for damping vibrations transmitted to a seat 102 of a vehicle. In step 802, a seat-damping device is provided to damp the vibrations transmitted to seat 102 of the vehicle. In some aspects, seat-damping device 200 comprises a housing 202 having an interior including an upper interior chamber 202A and a lower interior chamber 202B. A plurality of poles 222A and 222B are disposed within the interior of housing 202 and are configured to form an orifice 216 extending between the upper interior chamber 202A and the lower interior chamber 202B of housing 202. A coil 218 is disposed adjacent to the plurality of poles 222A and 222B for generating a current-induced magnetic field. The magnitude and polarity of the current-induced magnetic field is adjusted by the current to act with or against the permanent magnetic field to cancel it out. The magnitude of the damping is proportional to a magnitude and polarity of the current-induced magnetic field based upon the direction of electrical current supplied to coil 218. A permanent magnet 220 is disposed between the plurality of poles 222A and 222B and generates a permanent magnetic field. MR fluid is disposed within housing 202 having MR properties that are changed by subjecting the MR fluid to a net magnetic field comprising a sum of the current-induced magnetic field and the permanent magnetic field.

In step 804, the magnitude, as discussed hereinabove, and the direction of the electrical current to be supplied to coil 218 to establish the polarity of the current-induced magnetic field achieve a damping force sufficient to damp the vibrations transmitted to the seat 102 of the vehicle is determined based on the permanent magnet 220 permanent magnetic field.

In step 806, the determined magnitude and direction of the electrical current supplied to coil 218 to generate the coil induced magnetic field having a desired polarity is controlled by a controller including at least one processor and at least one memory device.

In step 808, the damping force, which is proportional to the net magnetic field, sufficient to damp the vibrations transmitted to the seat 102 of the vehicle is generated.

It will be appreciated that the example embodiment of method 800 is provided for illustrative purposes alone and that different and/or additional steps may be included in method 800 without deviating beyond the scope thereof. It will also be appreciated that various actions described herein may occur in a different order or sequence.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. A seat-damping device for damping vibrations transmitted to a seat of a vehicle, the seat-damping device comprising:
   a housing having an interior, an upper interior chamber, and a lower interior chamber;
   a piston shaft extending into the interior of the housing; and
   a piston head positioned within the interior of the housing for axial displacement within the housing, wherein the piston head defines the upper and lower interior chambers on opposing sides thereof, the piston head comprising:
  a top pole disposed on a same side of the piston head as the upper interior chamber, wherein a bottom surface of the top pole is adjacent to a first end of the piston shaft;
  a bottom pole disposed on a same side of the piston head as the lower interior chamber;
  at least one permanent magnet, which is configured to generate a permanent magnetic field, is a disk magnet attached to the bottom pole and is positioned between the top and bottom poles, such that the top and bottom poles do not contact each other; and
  at least one coil, which is disposed adjacent to, and circumferentially about, the top pole and is configured to generate a current-induced magnetic field proportional to a magnitude of an electrical current supplied to the coil, a polarity and/or magnitude of the current-induced magnetic field being based upon a direction and/or the magnitude of the electrical current; and
a magnetorheological (MR) fluid disposed within and filling substantially all of the upper and lower interior chambers of the housing, wherein the MR fluid is movable between the upper and lower interior chambers by the axial displacement of the piston shaft within the housing, wherein the MR fluid has a predetermined magnetically responsive property, and wherein a state of the predetermined magnetically responsive property of the MR fluid is selectively adjustable by subjecting the MR fluid to a net magnetic field, which is defined as a sum of the current-induced magnetic field and the permanent magnetic field;
wherein the seat-damping device is configured to generate a damping force proportional to the net magnetic field; and
wherein the MR fluid is moved between the upper and lower interior chambers of the housing upon the axial displacement of the piston shaft within the housing.

2. The seat-damping device of claim 1, wherein the bottom surface of the top pole and the first end of the piston shaft are coplanar with each other, and/or wherein no portion of the piston shaft extends through or is in contact with the bottom pole.

3. The seat-damping device of claim 1, wherein the at least one permanent magnet is integrated into the bottom pole and/or in contact with the first end of the piston shaft.

4. The seat-damping device of claim 1, comprising a flux ring disposed between an interior surface of the housing and the top and bottom poles, such that at least one orifice is formed between the flux ring and the top and bottom poles, such that the MR fluid is movable through the orifice, wherein the net magnetic field exists at a first active region proximate where the orifice opens into the lower interior chamber of the housing and a second active region proximate where the orifice opens into the upper interior chamber of the housing.

5. The seat-damping device of claim 4, wherein the piston head comprises end plates disposed on opposing axial ends thereof to hold at least the top pole, the bottom pole, the flux permanent magnet, the coil, and the flux ring together so as to be movable in a unitary fashion.

6. The seat-damping device of claim 1, wherein the damping force is configured to be driven to an off-state damping force when the magnitude and the direction of the electrical current is between about −1.0 A and about −2.0 Amperes (A).

7. The seat-damping device of claim 1, wherein a fluid yield strength of the MR fluid is controlled such that a relationship between the fluid yield strength and a viscosity of the MR fluid is substantially approximate to $10^{10}$ Pascal per second (Pa/s).

8. The seat-damping device of claim 1, wherein poles of the at least one permanent magnet are aligned with poles of the at least one coil.

9. The seat-damping device of claim 1, wherein the seat-damping device is operable to generate between about 0.3 kilo Newton per meter per second (kN/(m/s)) and about 1.2 kN/(m/s) of damping.

10. The seat-damping device of claim 1, wherein the seat-damping device is operable to generate the damping force at between about −2.0 A and about 5.0 A of current.

11. The seat-damping device of claim 10, wherein the damping force generated by the seat-damping device is between about 2.5 kN and about 0.5 kN for a maximum positive piston velocity.

12. The seat-damping device of claim 10, wherein the damping force generated by the seat-damping device is between about −2.5 kN and about −0.5 kN for a maximum negative piston velocity.

13. The seat-damping device of claim 1, wherein the permanent magnetic field provides for fail-safe damping of the seat-damping device when the coil is not generating a current-induced magnetic field.

14. A seat-damping system for damping vibrations transmitted to a seat of a vehicle, the seat-damping system comprising:
  at least one sensor;
  a seat-damping device comprising:
    a housing having an interior, an upper interior chamber and a lower interior chamber;
    a piston shaft extending into the interior of the housing; and
    a piston head positioned within the interior of the housing for axial displacement within the housing, wherein the piston head defines the upper and lower interior chambers on opposing sides thereof, the piston head comprising:
      a top pole disposed on a same side of the piston head as the upper interior chamber, wherein a bottom surface of the top pole is adjacent to a first end of the piston shaft;
      a bottom pole disposed on a same side of the piston head as the lower interior chamber;
      at least one permanent magnet, which is configured to generate a permanent magnetic field, is a disk magnet attached to the bottom pole and is positioned between the top and bottom poles, such that the top and bottom poles do not contact each other; and
      at least one coil, which is disposed adjacent to, and circumferentially about, the top pole and is configured to generate a current-induced magnetic field proportional to a magnitude of an electrical current supplied to the coil, a polarity and/or magnitude of the current- induced magnetic field being based upon a direction and/or the magnitude of the electrical current; and
    a magnetorheological (MR) fluid disposed within and filling substantially all of the upper and lower interior chambers of the housing, wherein the MR fluid is movable between the upper and lower interior chambers by the axial displacement of the piston shaft within the housing, wherein the MR fluid has a predetermined magnetically responsive property, and wherein a state of the predetermined magnetically responsive property of the MR fluid is selectively adjustable by subjecting the MR fluid to a net magnetic field, which is defined as a sum of the current-induced magnetic field and the permanent magnetic field;

wherein the MR fluid is moved between the upper and lower interior chamber of the housing upon the axial displacement of the piston shaft within the housing; and a controller including at least one hardware processor and at least one memory, wherein:
  the controller is in electronic communication with the at least one sensor and the seat-damping device;
  the controller is configured to calculate a damping solution and transmit a control signal to a seat-damping device;
  the controller is configured to control the seat-damping device to generate a damping force sufficient to damp the vibrations transmitted to the seat of the vehicle; and
  the damping force generated by the seat-damping device is proportional to the net magnetic field.

15. The seat-damping system of claim 14, wherein the bottom surface of the top pole and the first end of the piston shaft are coplanar with each other, and/or wherein no portion of the piston shaft extends through or is in contact with the bottom pole.

16. The seat-damping system of claim 15, wherein the piston head comprises a flux ring disposed between an interior surface of the housing and the top and bottom poles, such that at least one orifice is formed between the flux ring and the top and bottom poles, such that the MR fluid is movable through the orifice, wherein the net magnetic field exists at a first active region proximate where the orifice opens into the lower interior chamber of the housing and a second active region proximate where the orifice opens into the upper interior chamber of the housing.

17. The seat-damping system of claim 14, wherein the controller is configured to control the magnitude and the direction of the electrical current supplied to the coil, the direction of the electrical current establishing the polarity of the current-induced magnetic field, such that the controller is configured to drive the damping force to an off-state damping force when the magnitude and the polarity direction of the electrical current is between about −1.0 A and about −2.0 A.

18. The seat-damping system of claim 17, wherein a fluid yield strength of the MR fluid is controlled such that a relationship between the fluid yield strength and a viscosity of the MR fluid is substantially approximate to $10^{10}$ Pascal per second (Pa/s).

19. The seat-damping system of claim 14, wherein the damping force generated by the seat-damping device is between about 2.5 kN and about 0.5 kN for a maximum positive piston velocity.

20. The seat-damping device of claim 14, wherein the damping force generated by the seat-damping device is between about −2.5 kN and about −0.5 kN for a maximum negative piston velocity.

21. The seat-damping device of claim 14, wherein the permanent magnetic field provides for fail-safe damping of the seat-damping device when the coil is not generating a current-induced magnetic field.

22. A method for damping vibrations transmitted to a seat of a vehicle, the method comprising:
  detecting vibrations of the vehicle using at least one sensor, wherein the vibrations of the vehicle correspond to the vibrations transmitted to the seat of the vehicle;
  providing a seat-damping device configured to damp the vibrations transmitted to the seat of the vehicle, the seat-damping device comprising:
    a housing having an interior, an upper interior chamber and a lower interior chamber;
    a piston shaft extending into the interior of the housing; and
    a piston head positioned within the interior of the housing for axial displacement within the housing, wherein the piston head defines the upper and lower interior chambers on opposing sides thereof, the piston head comprising:
      a top pole disposed on a same side of the piston head as the upper interior chamber, wherein a bottom surface of the top pole is adjacent to a first end of the piston shaft;
      a bottom pole disposed on a same side of the piston head as the lower interior chamber;
      at least one permanent magnet, which is configured to generate a permanent magnetic field, is a disk magnet attached to the bottom pole and is positioned between the top and bottom poles, such that the top and bottom poles do not contact each other; and
      at least one coil, which is disposed adjacent to, and circumferentially about, the top pole and is configured to generate a current-induced magnetic field proportional to a magnitude of an electrical current supplied to the coil, a polarity and/or magnitude of the current-induced magnetic field being based upon a direction and/or the magnitude of the electrical current; and
    a magnetorheological (MR) fluid disposed within and filling substantially all of the upper and lower interior chambers of the housing, wherein the MR fluid is movable between the upper and lower interior chambers by the axial displacement of the piston shaft within the housing, wherein the MR fluid has a predetermined magnetically responsive property, and wherein a state of the predetermined magnetically responsive property of the MR fluid is selectively adjustable by subjecting the MR fluid to a net magnetic field, which is defined as a sum of the current-induced magnetic field and the permanent magnetic field;
  communicating the vibrations detected by the at least one sensor to a controller, which comprises at least one hardware processor and memory;
  calculating, in the controller and based on the permanent magnetic field generated by the permanent magnet, the magnitude and the direction of the electrical current that must be supplied to the coil to generate a damping force sufficient to damp the vibrations transmitted to the seat of the vehicle;
  supplying, from the controller to the coil, an electrical current having the magnitude and the direction that was calculated by the controller, wherein the polarity and/or the magnitude of the current-induced magnetic field is based upon a direction and/or the magnitude of the electrical current supplied to the coil;

controlling the magnitude and the direction of the current-induced magnetic field based on the magnitude and the direction of the electrical current supplied to the coil; and generating the damping force, which is proportional to the net magnetic field, sufficient to damp the vibrations transmitted to the seat of the vehicle.

23. The method of claim 22, comprising receiving, at the controller, an input from the at least one sensor or a switch connected to a portion of a seat suspension, on which the seat is mounted to the vehicle, such that calculating the magnitude and the direction of the electrical current is based on both the permanent magnetic field and the input.

24. The method of claim 22, wherein controlling the magnitude and the polarity of the current-induced magnetic field based on the magnitude and the direction of the electrical current supplied to the coil further comprises supplying between about −1.0 A and about −2.0 A of the electrical current to the coil to drive the damping force to an off-state damping force.

25. The method of claim 24, wherein controlling the determined magnitude and the polarity of the current-induced magnetic field based on the magnitude and the direction of the electrical current supplied to the coil comprises supplying the electrical current such that a ratio of a fluid yield strength of the MR fluid and a viscosity of the MR fluid is substantially approximate to $10^{10}$ Pascal per second (Pa/s).

26. The method of claim 22, wherein the damping force is generated using the seat-damping device, and wherein the damping force generated by the seat-damping device is between about 2.5 kN and about 0.5 kN for a maximum positive piston velocity.

27. The method of claim 22, wherein the damping force is generated using the seat-damping device, and wherein the damping force generated by the seat-damping device is between about −2.5 kN and about −0.5 kN for a maximum negative piston velocity.

28. The method of claim 22, comprising providing for fail-safe damping of the seat-damping device with the permanent magnetic field, the fail-safe damping occurring when the coil is not generating any current-induced magnetic field.

* * * * *